United States Patent
Kanjlia et al.

(10) Patent No.: US 10,586,278 B2
(45) Date of Patent: *Mar. 10, 2020

(54) SYSTEMS AND METHODS FOR PROVIDING A USER INTERFACE FOR FACILITATING PERSONAL PAYMENT TRANSACTIONS

(71) Applicant: Capital One Services, LLC, McLean, VA (US)

(72) Inventors: Gagan Kanjlia, Ashburn, VA (US); Scott Zimmer, Charlotte, NC (US); Robert J. Larson, Havertown, PA (US); Alexander S. Wilson, Kennett Square, PA (US); Vishal Puri, Ashburn, VA (US); Jay F. Pober, Cherry Hill, NJ (US)

(73) Assignee: Capital One Services, LLC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,708

(22) Filed: Oct. 19, 2018

(65) Prior Publication Data

US 2019/0057442 A1 Feb. 21, 2019

Related U.S. Application Data

(63) Continuation of application No. 14/267,421, filed on May 1, 2014, which is a continuation of application
(Continued)

(51) Int. Cl.
*G06Q 40/00* (2012.01)
*G06Q 40/02* (2012.01)
(Continued)

(52) U.S. Cl.
CPC ............ *G06Q 40/02* (2013.01); *G06Q 20/10* (2013.01); *G06Q 20/22* (2013.01); *G06Q 20/223* (2013.01);
(Continued)

(58) Field of Classification Search
CPC ........ G06Q 40/02; G06Q 20/10; G06Q 20/22; G06Q 20/223; G06Q 30/02; G06Q 20/3223; G06Q 20/4014; G06Q 20/025
(Continued)

(56) References Cited

U.S. PATENT DOCUMENTS 7,519,539 B1 * 4/2009 Fliess ..................... G06Q 10/00
705/301
8,032,457 B2 10/2011 Ostrovsky
(Continued)

FOREIGN PATENT DOCUMENTS

EP 1866801 A1 12/2007

OTHER PUBLICATIONS

HP and GTE integrate technologies to maximize electronic-business security; GTE joins HP praesidium partner program. (Aug. 11, 1998). Business Wire Retrieved from http://dialog.proquest.com/professional/docview/666856908?accountid=142257 on Oct. 24, 2019 (Year: 1998).*
(Continued)

*Primary Examiner* — Kito R Robinson
(74) *Attorney, Agent, or Firm* — Finnegan, Henderson, Farabow, Garrett & Dunner, LLP

(57) ABSTRACT

Systems and processes are disclosed for providing customized user interfaces for facilitating personal payment transactions. In certain embodiments, disclosed embodiments may generate a dynamic and customized interface for effecting the personal payment transaction by, for example, providing one or more options for the payer to fund the payment. The disclosed embodiments may provide an interface that includes one or more suggested recipients for identifying the payee associated with the payment transaction. The disclosed embodiments may also provide an interface that includes one or more routing options to route the
(Continued)

payment. The disclosed embodiments may also provide an interface that provides one or more communication channel options for parties associated with the personal payment transaction to communicate.

20 Claims, 26 Drawing Sheets

Related U.S. Application Data

No. 14/109,017, filed on Dec. 17, 2013, now Pat. No. 10,068,288.

(60) Provisional application No. 61/738,101, filed on Dec. 17, 2012.

(51) Int. Cl.

| | | |
|---|---|---|
| *G06Q 20/10* | (2012.01) | |
| *G06Q 20/22* | (2012.01) | |
| *G06Q 20/32* | (2012.01) | |
| *G06Q 30/02* | (2012.01) | |
| *G06Q 20/40* | (2012.01) | |

(52) U.S. Cl.
CPC ..... *G06Q 20/3223* (2013.01); *G06Q 20/4014* (2013.01); *G06Q 30/02* (2013.01); *G06Q 40/025* (2013.01)

(58) Field of Classification Search
USPC .......................................................... 705/38
See application file for complete search history.

(56) References Cited

U.S. PATENT DOCUMENTS

| | | | | |
|---|---|---|---|---|
| 8,121,945 | B2 | 2/2012 | Rackley et al. | |
| 8,225,992 | B2 | 7/2012 | Henry | |
| 8,321,383 | B2 | 11/2012 | Schumacher et al. | |
| 8,369,842 | B2* | 2/2013 | Proctor, Jr. | H04W 4/029 455/414.3 |
| 8,509,734 | B1* | 8/2013 | Gupta | G06Q 20/04 455/406 |
| 8,630,948 | B1* | 1/2014 | Hildebrand | G06Q 30/02 705/35 |
| 8,750,901 | B1* | 6/2014 | Gupta | G06Q 20/3223 455/456.3 |
| 9,043,888 | B1* | 5/2015 | Ibel | G06Q 50/01 726/7 |
| 9,166,961 | B1* | 10/2015 | Johansson | H04L 63/08 |
| 9,378,467 | B1* | 6/2016 | Chaiyochlarb | G06N 5/047 |
| 9,680,945 | B1* | 6/2017 | Treves | H04L 67/22 |
| 10,185,480 | B1* | 1/2019 | Kuo | G06F 3/04842 |
| 2002/0059066 | A1* | 5/2002 | O'Hagan | G10L 15/30 704/231 |
| 2003/0084188 | A1* | 5/2003 | Dreyer | G06Q 40/02 709/246 |
| 2003/0194065 | A1* | 10/2003 | Langseth | G06Q 10/10 379/88.18 |
| 2004/0187091 | A1* | 9/2004 | Parasnis | G06Q 10/087 717/104 |
| 2004/0189441 | A1* | 9/2004 | Stergiou | G06Q 20/4014 340/5.51 |
| 2005/0125351 | A1 | 6/2005 | Tidwell et al. | |
| 2005/0144096 | A1* | 6/2005 | Caramanna, II | G06Q 40/06 705/30 |
| 2007/0073598 | A1* | 3/2007 | Parasnis | G06Q 10/087 705/26.4 |
| 2007/0169182 | A1* | 7/2007 | Wolfond | G06F 21/31 726/7 |
| 2007/0294081 | A1* | 12/2007 | Wang | G10L 15/26 704/200 |
| 2008/0015985 | A1 | 1/2008 | Abhari et al. | |
| 2008/0313082 | A1* | 12/2008 | Van Bosch | G06Q 20/02 705/50 |
| 2010/0211445 | A1* | 8/2010 | Bodington | G06Q 30/02 705/14.17 |
| 2011/0202459 | A1 | 8/2011 | Shah et al. | |
| 2012/0054097 | A1 | 3/2012 | Frohwein et al. | |
| 2012/0079045 | A1* | 3/2012 | Plotkin | H04L 51/12 709/206 |
| 2012/0123932 | A1* | 5/2012 | LeCuyer | G06Q 40/02 705/39 |
| 2012/0233072 | A1* | 9/2012 | Calman | G06Q 40/02 705/44 |
| 2012/0271765 | A1* | 10/2012 | Cervenka | G06Q 20/12 705/44 |
| 2012/0323669 | A1* | 12/2012 | Kohlmeier | G06Q 30/02 705/14.38 |
| 2013/0060689 | A1 | 3/2013 | Oskolkov et al. | |
| 2013/0166332 | A1 | 6/2013 | Hammad | |
| 2013/0238492 | A1* | 9/2013 | Muthu | G06Q 20/10 705/39 |
| 2013/0282459 | A1* | 10/2013 | Smets | G06Q 20/045 705/14.23 |
| 2014/0025567 | A1* | 1/2014 | Rigby | G06Q 20/26 705/39 |
| 2014/0122497 | A1* | 5/2014 | Eigner | H04L 67/30 707/740 |
| 2014/0189829 | A1* | 7/2014 | McLachlan | H04L 63/08 726/6 |
| 2014/0279433 | A1* | 9/2014 | Holman | G06Q 20/12 705/39 |
| 2015/0310444 | A1* | 10/2015 | Chen | G06Q 20/4016 705/44 |
| 2017/0017951 | A1* | 1/2017 | Lee | G06Q 20/202 |

OTHER PUBLICATIONS

"Mobile proximity payments: Scenarios for market development including case studies of key Asian markets," *Business Wire* (2008), available at https://dialog.proquest.com/professional/docview/677066309.

U. B. Ceipidor et al., "A survey about user experience improvement in mobile proximity payment," *Proceedings at the 2012 4th International Workshop on Near Field Communication (NFC)* (2012), available at http://dx.doi.org/10.1109/NFC.2012.18.

\* cited by examiner

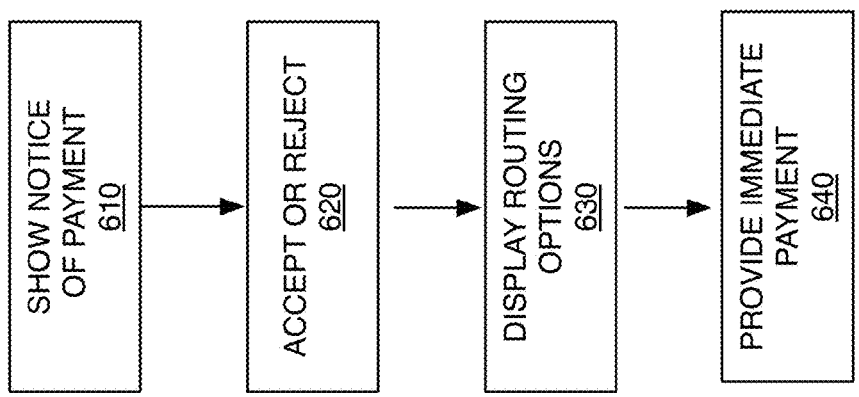

SYSTEMS AND METHODS FOR PROVIDING A USER INTERFACE FOR FACILITATING PERSONAL PAYMENT TRANSACTIONS

PRIORITY CLAIM

This application is a continuation of U.S. patent application Ser. No. 14/267,421, filed May 1, 2014, which is a continuation of U.S. patent application Ser. No. 14/109,017, filed Dec. 17, 2013 (now U.S. Pat. No. 10,068,288, issued Sep. 4, 2018), which claims priority under 35 U.S.C. § 119 to U.S. provisional patent application No. 61/738,101, filed on Dec. 17, 2012. The above-referenced applications are incorporated herein by reference in their entireties.

FIELD

The disclosed embodiments generally relate to payment systems, and more particularly, to systems, processes, and computer programs for facilitating users to effect personal payment transactions.

Electronic personal payment transactions, such as person-to-person payment and person-to-business payment, represent a rapidly growing industry. Current personal payment systems, however, are often inflexible and inconvenient. There is no payment gateway where money movement may be completed through a singular portal irrespective of payment medium. For example, a payee may have to create an account with a financial service provider in order to collect the payment delivered by that financial service provider. Another example of the inflexibility of existing personal payment systems is the lack of customization with respect to sending and receiving payment. For example, current systems do not provide mechanisms to aid and facilitate decisions surrounding the potential routing of payments for both generic and specific types of payments.

Lack of flexible and distinct payment channels may cause the user to research different payment platforms. This may also require the user to look up information, and make complex multiple parameter evaluations with regards to overall functionality of a given transaction. Moreover, the payer is offered no flexibility or optionality with regards to the sourcing of the funds. In addition, the payee is usually not offered options as to how the payment should be received, and consequently, the payee has no influence over the cost, the speed, user-friendliness, and the stability of the payment route.

Furthermore, existing personal payment systems may cause users inconveniences due to the lack of mechanisms that could minimize the efforts of the payer to initiate or complete a payment transaction. For example, the payer may have to spend a considerable amount of time to set up an account to effect a transaction or manually look up the payee's information (e.g., the payee's bank account number) in order to set up and complete a transaction. As another example, the payer and the payee may not freely choose a payment rail or the payee may not be able to withdraw the payment immediately if the payee receives a check that deposited into his bank account.

Moreover, existing personal payment systems are built around the system provider's needs rather than the needs or desires of their customers. Current systems thus focus on merely effecting the payment itself, with limited additional interaction with the users. Currently systems also provide limited mechanisms for the payee to initiate a transaction by requesting payment from the intended payer. For example, current systems may provide the same user interface to all the users, without considering an individual's preference, technical experience, and transactional histories.

Furthermore, existing personal payment systems have limited functionality to facilitate group or crowd payments/collections. Existing personal payment systems also lack mechanisms that, for example, provide feedback to users with respect to the status of payments or how they were received.

Thus, existing personal payment systems are limited, inflexible, inconvenient, and not personalized.

SUMMARY

Systems and methods for providing personal payment processes are described. In certain embodiments, systems, methods and computer programs are disclosed for providing a user interface that provides mechanism for a user to easily and accurately complete personal payment transactions. Disclosed embodiments include mechanisms that generate a dynamic and personalized interface to assist a payer to effect a payment transaction. The mechanisms may include software that when executed by a processor generate information used to display, via a customized interface, suggested recipients associated with the payment transaction for identifying a payee, and information used to display, to the payer via the customized interface, funding source(s) to fund the payment transaction. In one embodiment, the software, when executed, may generate information used to display, via the customized interface, routing option(s) to rail the payment and provide, via the customized interface, channels for the payer and the payee to communicate.

Consistent with some disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate various embodiments and aspects of the disclosed embodiments, and together with the description, serve to explain the principles of the disclosed embodiments.

FIG. 6A is an exemplary process flow for receiving payment consistent with the disclosed embodiments.

DESCRIPTION OF THE EMBODIMENTS

Figure 1:
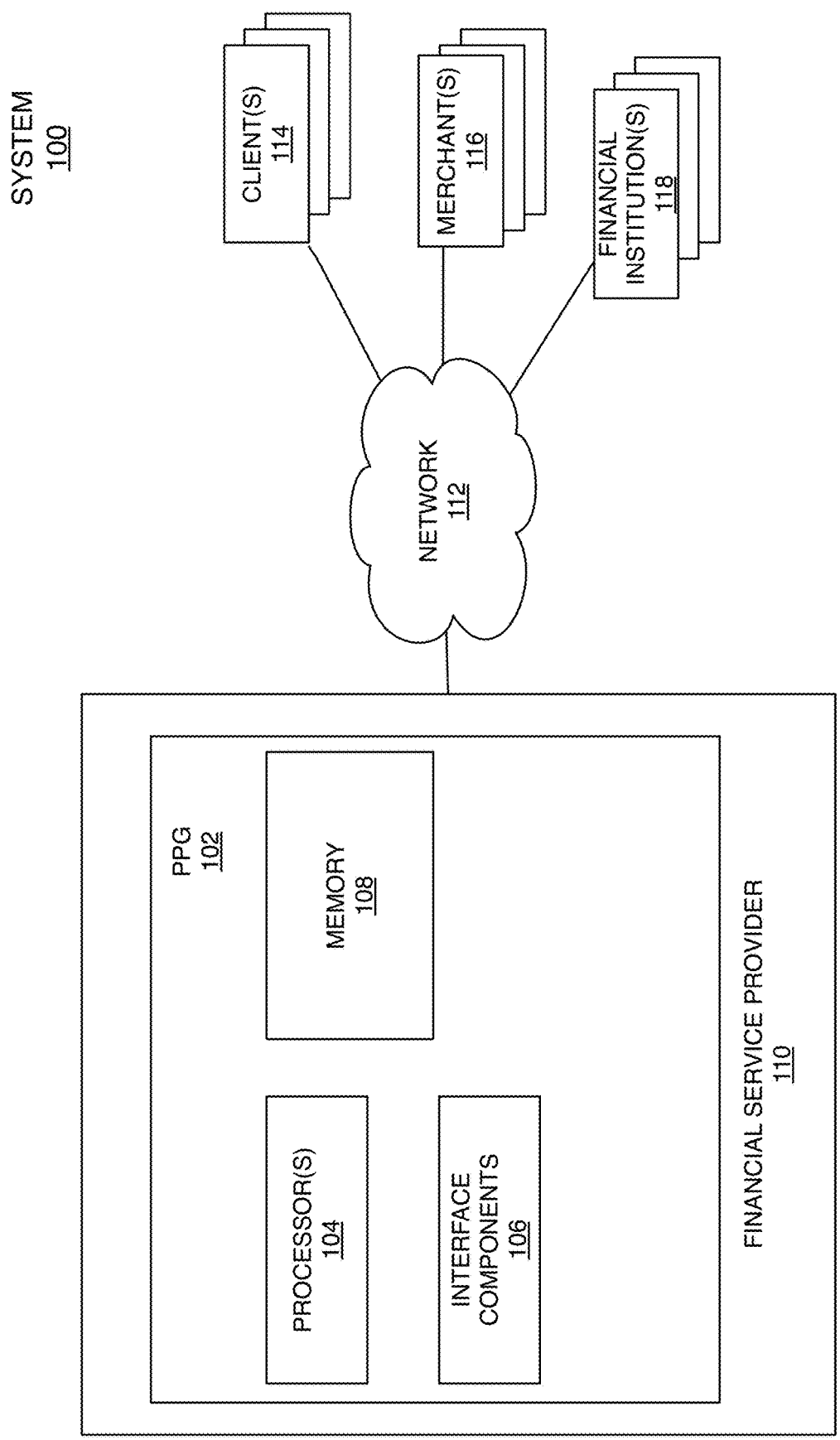
FIG. 1 is diagram of an exemplary system that may be used to implement disclosed embodiments.

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will now be made in detail to exemplary embodiments, examples of which are illustrated in the accompanying drawings and disclosed herein. Wherever convenient, the same reference numbers may be used in the drawings and the following description to refer to the same or similar parts. Also, similarly named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations may be possible, without departing from the spirit and scope of the disclosure. Accordingly, the following detailed description does not limit the disclosure. Instead, the proper scope of the disclosure is defined by the appended claims.

FIG. 1 shows an exemplary system 100 configured to perform one or more processes consistent with the disclosed embodiments. In certain aspects, one or more components of system 100 may be configured to execute one or more software processes to provide one or more aspects of the disclosed embodiments. The components and arrangement shown in FIG. 1 are not intended to be limiting to the disclosed embodiment as the components used to implement the processes and features disclosed herein may vary.

In accordance with disclosed embodiments, system 100 may include financial service provider 110, Personal Payment Genie ("PPG") 102, network 112, one or more clients 114, one or more merchants 116, and one or more financial institutions 118. System 100 may include other components to provide, collect, process, and transmit information consistent with the disclosed embodiments.

Personal Payment Genie ("PPG") 102 may be a computer-based system including computer system components, such as one or more servers, desktop computers, workstations, tablets, hand held computing devices, memory devices, and/or internal network(s) connecting the components. In some embodiments, PPG 102 may be a server that includes one or more processor(s) 104, memory devices, such as memory 108, and interface components 106. PPG 102 may be a single server or may be configured as a distributed computer system including multiple servers or computers that interoperate to perform one or more of the processes and functionalities associated with the disclosed embodiments. In certain embodiments, PPG 102 may be a server that is associated with financial service provider 110. Financial service provider 110 may represent, for example, a bank, a merchant, a credit card provider, or any other entity that provides financial services to customers. In some aspects, financial service provider 110 may be an institution or an individual that collects and processes personal payment for certain transactions, and transfers the personal payment to one or more intended payees. In other aspects, the functionalities performed by PPG 102 as disclosed herein may be software that is executed by one or more processors associated with financial service provider 110. That is, instead of being computer-based system with hardware and software, PPG 102 may represent software instructions stored in a memory (without hardware components) that are executed by a processor associated with financial service provider 110.

Processor(s) 104 may be one or more known processing devices, such as a microprocessor from the Pentium™ family manufactured by Intel™ or the Turion™ family manufactured by AMD™. Processor(s) 104 may include a single core or multiple core processor system that provides the ability to perform parallel processes simultaneously. For example, processor(s) 104 may be a single core processor that is configured with virtual processing technologies known to those skilled in the art. In some embodiments, processor(s) 104 may use logical processors to simultaneously execute and control multiple processes. Processor(s) 104 may implement virtual machine technologies, or other similar known technologies to provide the ability to execute, control, run, manipulate, store, etc. multiple software processes, applications, programs, etc. In other embodiments, processor(s) 104 may include a multiple-core processor arrangement (e.g., dual or quad core) that is configured to provide parallel processing functionalities to allow PPG 102 to execute multiple processes simultaneously. One of ordinary skill in the art would understand that other types of processor arrangements could be implemented that provide for the capabilities disclosed herein.

PPG 102 may also include one or more storage devices configured to store instructions used by processor(s) 104 (or other components) to perform certain functions related to the disclosed embodiments. In one example, PPG 102 may include memory 108 that includes instructions to enable processor(s) 104 to execute one or more applications, such as server applications, network communication processes, or any other type of application or software available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Methods, systems, and computer programs consistent with the disclosed embodiments are not limited to separate programs or computers configured to perform dedicated tasks. For example, PPG 102 may include a memory that may include one or more programs to perform one or more functions for multiple user display control. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

PPG 102 may also be communicatively connected to one or more memory devices (e.g., databases (not shown)) locally or through a network. The remote memory devices may be configured to store information and may be accessed and/or managed by PPG 102. By way of example, the remote memory devices may be document management systems, Microsoft SQL database, Share Point databases, Oracle™ databases, Sybase™ databases, or other relational databases. Systems, processes, computer programs, and tangible computer-readable medium of disclosed embodiments, however, are not limited to separate databases or even to the use of a database.

PPG 102 may also include one or more I/O devices that may comprise one or more interfaces for receiving signals or input from input devices and providing signals or output to one or more output devices that allow data to be received and/or transmitted by PPG 102. For example, PPG 102 may include interface components 106 that may provide interfaces to one or more input devices, such as one or more keyboards, mouse devices, and the like, that enable PPG 102 to receive data from one or more users such as client(s) 114. Furthermore, interface components 106 may include components configured to send and receive information between components of PPG 102 or external to PPG 102, such as network 112.

Network 112 may be any type of network that provides communications, exchanges information, and/or facilitates the exchange of information between PPG 102 and client(s) 114. In one embodiment, network 112 may be the Internet, a Local Area Network, or other suitable connection(s) that enables system 100 to send and receive information between the components of system 100.

Client(s) 114 may be one or more computer systems. For example, client(s) 114 may include a general purpose or notebook computer, a mobile device with computing ability, a server, a desktop computer, tablet, or any combination of these computers and/or affiliated components. For example, client(s) 114 may be a smartphone, which is adopted to perform all the functions consistent with the disclosed embodiments. In some embodiments, each client may be a computer system or device that is operated by a user who is a customer or a potential customer of financial service provider 110. Client(s) 114 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client(s) 114 may also include communication software that, when executed by a processor, provides communications with network 112, such as Web browser software, tablet or smart hand held device networking software, etc.

Merchant(s) 116 may include systems operated by, for example, online retailers and their affiliates, brick-and-mortar retailers and their affiliates, or the like. Merchant(s) 116 may be communicatively connected to other devices of system 100 through, for example, network 112 or direct connection. Merchant(s) 116 may receive and send payments consistent with disclosed embodiments.

Financial institution(s) 118 ("FI") may include one or more systems operated by, for example, one or more financial institutions other than financial service provider 110 (i.e. those not affiliated with or part of the institution operating financial service provider 110). FI 118 may be communicatively connected to other devices of system 100 via, for example, network 112 or direct connection. For example, FI 118 may be operated by a bank, a credit union, a banking cooperative, a money transmitter, a broker, payment service network, or the like. FI 118 may receive and send payments consistent with disclosed embodiments.

Figure 2:
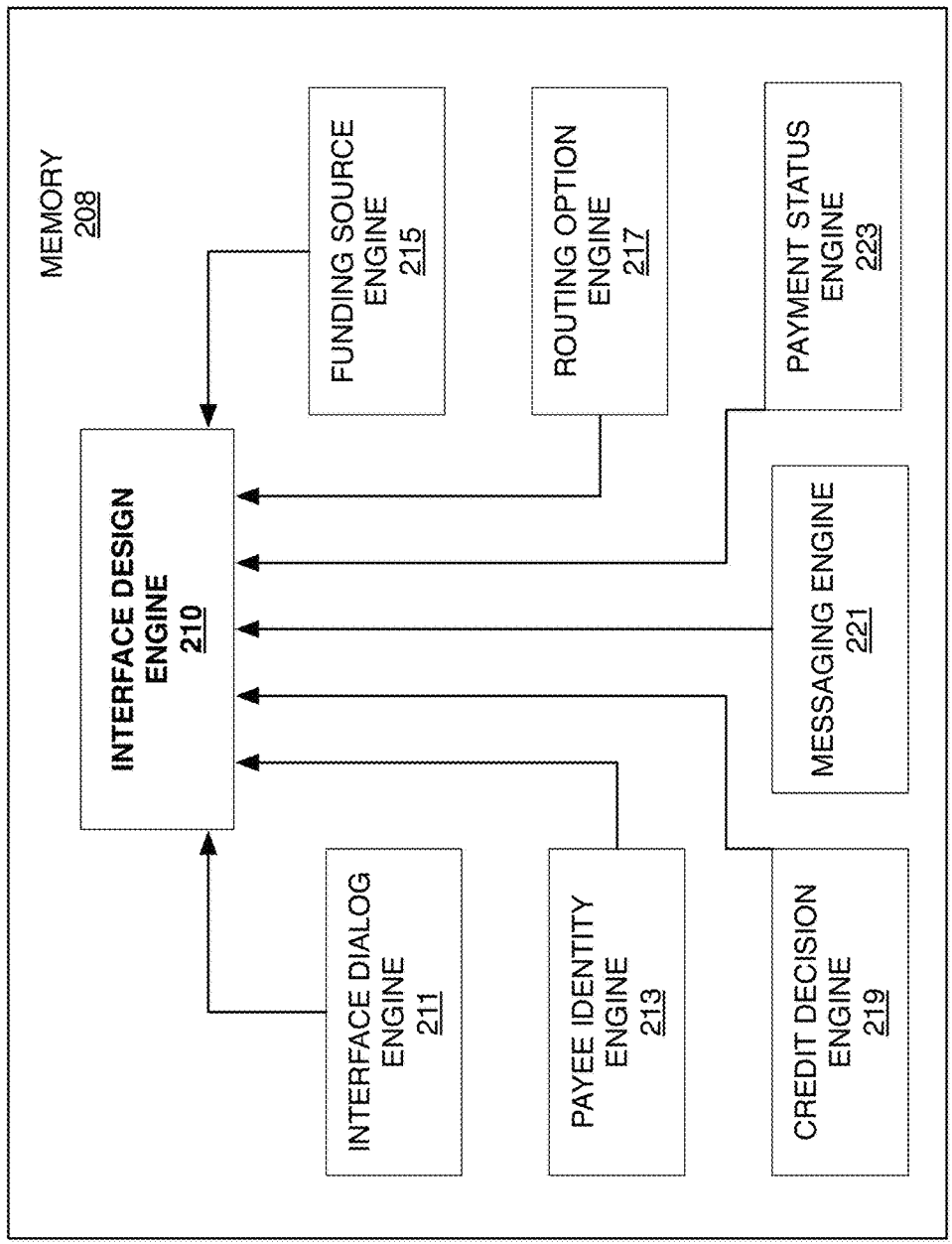
FIG. 2 is a diagram of exemplary engines for implementing certain aspects of disclosed embodiments.
Figure 2:
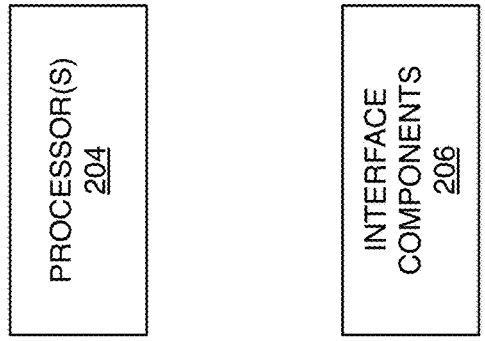

FIG. 2 illustrates a diagram of an exemplary PPG 202 consistent with disclosed embodiments. In this example, PPG 202 may include a number of engines that may be, in some embodiments, used to implement disclosed embodiments. The disclosed "engines" (also known as "modules") may be implemented in software, hardware, firmware, a mix of any of those, or the like. For example, if the disclosed "engines" are implanted in software, they may be stored in a memory 208 included in PPG 202. Processor(s) 204, interface components 206, and memory 208 may be utilized to perform processes to implement and facilitate operations of the illustrated engines in FIG. 2. The engines may include software, hardware, or firmware instructions (or a combination thereof) executable by one or more processors, such as processor(s) 204, alone or in various combinations with other engines disclosed in this or other embodiments. For example, interface design engine 210 may be configured to interact with other engines of PPG 202, shown or not shown in FIG. 2, to perform functions consistent with disclosed embodiments.

In one aspect, to provide a user-friendly and dynamic interface to effect a payment transaction, interface design engine 210 may be configured to customize a natural and intuitive interface for a particular user, such as a customer of financial service provider 110. The user may be associated with client 114, such as a customer of financial service provider 110 that uses a mobile device to perform online banking or other financial service processes. In some embodiments, interface design engine 210 may be configured to interact with interface dialog engine 211 to perform these functions.

In some embodiments, interface dialog engine 211 may be configured to dynamically determine an appropriate interface for the user. For example, based on the user's information including, for example, transaction history, profile, demographic information, behavior, information obtained from social networking sites, etc., interface dialog engine 211 may determine what type of interface that the user is most receptive to. In another example, if a user is technologically experienced, interface dialog engine 211 may determine whether the interface for this user will have a different look and feel from a user interface for another user who is less technologically experienced. In other embodiments, interface dialog engine 211 may be configured to determine an appropriate voice that PPG 202 may use while interacting with a particular user, based on this user's preference or available user profiles. Interface dialog engine 211 may include software that when executed by a processor determines the type of technological experience of the user. For example, interface dialog engine 211 may include software that when executed by a processor may determine, based on one or more user profile information, that the user is highly educated (e.g., based on educational background information) or has experience with online processes (e.g., based on a number of social media or online-based accounts identified in the user profile data). As another example, interface dialog engine 211 may also include software that when executed by a processor, may determine the user's technical experience by using information including, for example, the user's age, input provided to interface dialog engine 211 for setting up the user interface (e.g., selecting manual input or voice input), commercial activities, and information gathered from other sources (e.g., social networking sites).

Based on the determination made by interface dialog engine 211, interface design engine 210 may be configured to customize an appropriate interface for a particular user. For example, interface design engine 210 may customize two different interfaces for two users who have different levels of technology skills for the same type of transaction (e.g., to provide the same financial service process for each user). As another example, interface dialog engine 211 may determine that a user prefers to use voice input to provide information used for a payment transaction. In this instance, interface design engine 210 may be configured to provide mechanisms that allow this user to perform financial service processes through voice-controlled inputs via client 114. Client 114 may be configured with voice translation software and/or hardware that translate voice input to digital signals that are processed and sent to PPG 202 for appropriate processing. For example, PPG 202 may receive information that a user has selected to use voice-controlled input via client 114. In response, interface design engine 210 may be configured to interact with interface dialog engine 211 to generate information that is provided in an interface sent to client 114 that tests whether PPG 202 and/or client 114 can accurately recognize and understand the user's voice input. In other aspects, interface design engine 210 may be configured to generate information that is provided in an interface that allows the user to confirm whether client 114 and/or PPG 202 has accurately received and translated the user's voice-input. Aspects of the disclosed embodiments may use known voice translation software and/or hardware for receiving, processing, and translating voice input from a user via client 114.

To minimize the user's efforts of providing information relating to the payment transaction, interface design engine 210 may be configured to generate information that is provided in an interface sent to client 114 that allows a payer to provide information regarding an intended payee. In one example, interface design engine 210 may generate information used in an interface sent to client 114 that displays one or more suggested recipients for identifying the payer's intended payee. In some embodiments, interface design engine 210 may be configured to interact with payee identity engine 213 to perform these functions.

In some embodiments, payee identity engine 213 may be configured to generate information that is provided in an interface sent to client 114 that provides suggested recipients of the payment based on one or more sources including, for example, the payer's phone contacts or electronic mail contact lists, social networking sites, the payer's website accounts, WhitePages®, checking account profile information, company databases having the contact information for both the payer and the payee, or the like.

Interface design engine 210 may also be configured to interact with payee identity engine 213 to determine one or more suggested recipients and an estimated level of confidence. In some embodiments, payee identity engine 213 may be configured to estimate the level of confidence with respect to the identity of the intended payee by considering one or more factors including, for example, payment and/or other user history, the quality of the data source, probability of coincidence, the form of payment, the physical proximity and/or presence of the payer and intended payee, and others.

Interface design engine 210 may be configured to generate an interface that provides an ordered list of the suggested recipients based on the confidence level. FIG. 5B shows an exemplary interface associated with this embodiment. In some embodiments, interface design engine 210 may be configured to generate information that is provided in an interface sent to client 114 that includes one or more identification measures, for instance, pictures, address, phone numbers, and other data to assist the user in identifying an intended payee. FIG. 5B shows an exemplary interface associated with this embodiment.

To provide a flexible way to fund the payment transaction, in some embodiments, PPG 202 may execute instructions to generate information that is provided in an interface sent to client 114 that provide one or more options for the payer to fund his/her payment transactions. For example, interface design engine 210 may be configured to generate information that is provided in an interface sent to client 114 that includes these options to the payer to choose. In some embodiments, interface design engine 210 may be configured to interact with funding source engine 215 to perform one or more of these functions.

The available funding source may be internal or external to financial service provider 110. For example, in some embodiments, a user wishing to transfer money to another person may not need to have an existing account (or open a new account) with financial service provider 110 in order to fund the payment transaction. Funding source engine 215 may be configured to consider one or more factors to estimate preferred funding sources, and determine which one(s) to be suggested to the payer by an interface that is provided by PPG 202 to client 114. For example, to determine preferred funding sources for the payer, funding source engine 215 may consider one or more factors including, such as, account transaction history, time, costs, available balance, available credit, pending transactions (both credit and debit), etc. In some embodiments, funding source engine 215 may be configured to determine a plurality of funding sources for the payer. In one aspect, interface design engine 210 may be configured to interact with funding source engine 215 to determine the suggested funding options and preferred funding source(s), and to generate information that is provided in an interface sent to client 114 to display the preferred funding source(s), or alternatively, all suggested funding options, via the interface.

To provide more flexibility as to how to send payment and how to receive payment associated the payment transaction, interface design engine 210 may be configured to generate information that is provided in an interface sent to client 114 that provides routing options to rail the payment that may be selected by the user of client 114 (e.g., as a payer and/or the payee). Railing a payment may refer to, for example, selecting a method for transferring funds from the payer to the payee. For example, interface design engine 210 may be configured to provide an interface allowing the user of client 114 to select book transfers (e.g., when both the payer and the payee have accounts with financial service provider 110) or select payment rails that involve more than one payment systems (e.g., when the user of client 114 makes an international remittance). Examples of domestic rails are MasterCard Network, Visa Network, ACH, Fedwire®, PayPal™, Dwolla, etc. In some embodiments, interface design engine 210 may be configured to interact with routing option engine 217 to generate information that is provided in an interface sent to client 114 that includes one or more routing options to a payee. The same or similar interface may also be provided to the payer consistent with disclosed embodiments. In some aspects, routing option engine 217 may consider one or more factors including, for example, type of payment, available information of the payee, locale of the payee, feedback and/or ranking of routes used in the past, historical behavior (e.g., route chosen in the past), and other data, to determine one or more suggested routing options. In other aspects, routing option engine 217 may be configured to determine which payment rail or rails represent the best fit for the payment. For example, routing option engine 217 may be configured to rank the payment rails by one or more parameters including, for instance, history, safety, speed, cost, stability, user-friendliness, and others parameters.

Interface design engine 210 may be configured to interact with routing option engine 217 to determine one or more suggested routing options that may be the best fit for the payee and their relative rankings. Interface design engine 210 may be configured to generate information used in an interface sent to client 114 that includes the suggested best-fit routing option(s) along with their relative rankings for the payee to select. Alternatively, in some embodiments, interface design engine 210 may be configured to generate information that is provided in an interface sent to client 114 that includes multiple (e.g., all determined) suggested routing options via the interface. Additionally or alternatively, interface design engine 210 may also be configured to generate information that is provided in an interface sent to client 114 that includes options for the payee to enter his/her preferred routing for receiving the incoming payment via the interface if his/her preferred routing option is not included in the suggested routing options provided in the interface sent from PPG 202 to client 114.

For certain routing rails provided or chosen by the payer or the payee, the payment may not be delivered immediately. In some embodiments, interface design engine 210 may be configured to interact with credit decision engine 219 to determine one or more options for the payee to apply for a credit advance to receive immediate payment. Interface design engine 210 may be configured to generate information that is provided in an interface sent to client 114 that includes the one or more credit advance options for the payee. For example, in one embodiment, credit decision engine 219 may be configured to determine whether a payment rail provided or chosen by the payer and/or the payee involves a wait time or clearing period. Further, credit decision engine 219 may be configured to determine the payee's willingness to accept additional cost of expedited payment rails, for example, making the payment via wire transfers. Credit decision engine 219 may further be configured to determine the payee's eligibility for credit advance in order to speed up the availability of funds. Credit decision engine 219 may determine the payee's eligibility for credit advance by considering, for example, the pending payment transaction (e.g., whether the payment transaction will be successfully completed), payee's available balances in the payee's linked accounts (e.g., with financial service provider 110), employment status, transactional history with financial service provider 110, and information provided by credit scoring agencies (e.g., Equifax®, TransUnion®, Innovis®, or Experian™). Credit decision engine 219 may be configured to provide information to interface design engine 210 reflecting the determination that the payee is willing and eligible for credit advance. Based on that information, interface design engine 210 may be configured to generate information that is provided in an interface sent to client 114 that includes mechanisms that allow the payee to apply for the credit advance.

Once the payee receives the payment, in some embodiments, interface design engine 210 may be configured to generate information that is provided in an interface sent to client 114 that allows the payee to redirect the received payment by allocating them for one or more purposes. For example, interface design engine 210 may be configured to interact with routing option engine 217 to obtain suggested allocation options.

Figure 7A:
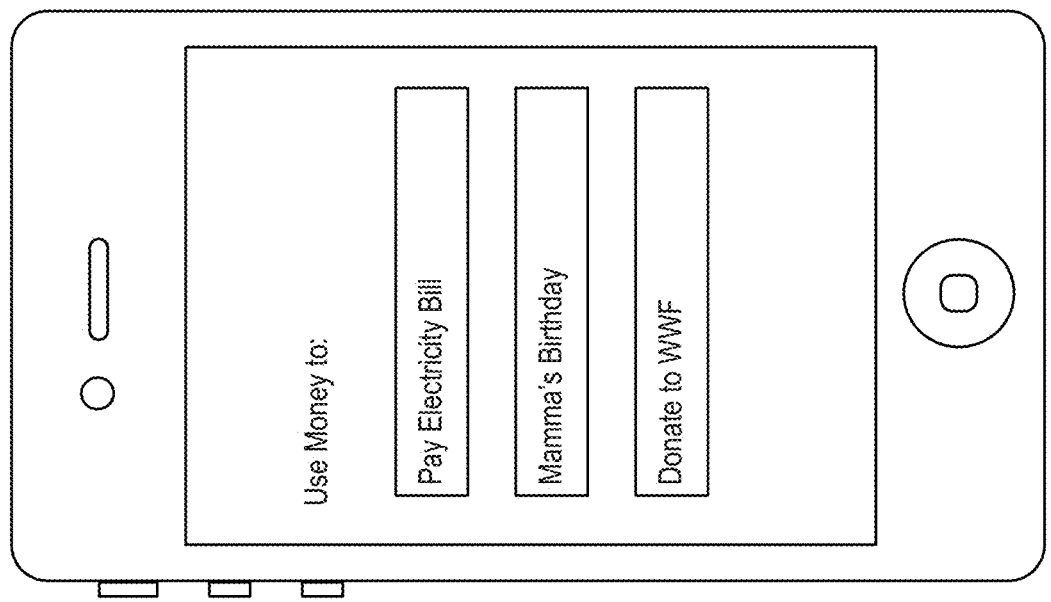
FIG. 7A is a screenshot of an exemplary interface for redirecting a received payment consistent with the disclosed embodiments.
Figure 7B:
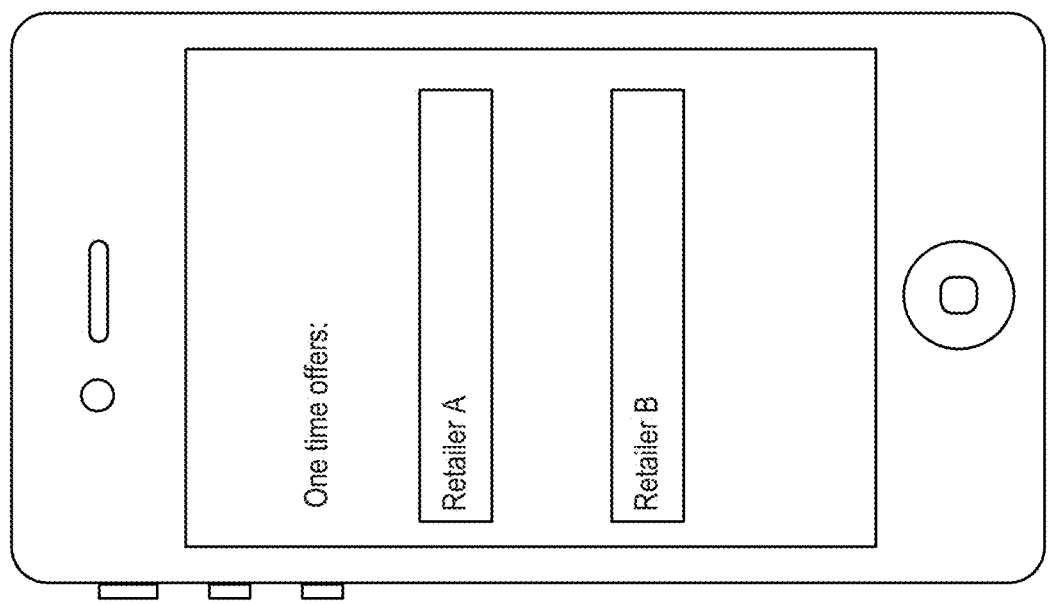
FIG. 7B is a screenshot of an exemplary interface for redirecting a received payment consistent with the disclosed embodiments.

In some aspects, routing option engine 217 may be configured to determine the suggested allocation options based on information obtained from, for example, the payee's profile, transaction history, social networking websites, and the like. Additionally or alternatively, routing option engine 217 may be configured to determine allocation options based on the payee's location, which may be, for example, a restaurant, a bar, and a store. These allocation options may be provided to interface design engine 210. Interface design engine 210 may be configured to generate information that is provided in an interface sent to client 114 that includes the allocation option(s) for selection by the user. For example, interface design engine 210 may be configured to generate information that is provided in an interface sent to client 114 that includes one or more allocation options including, for example, putting payment towards phone bill, buying a pastry at a bakery nearby, buying candy bars for some children in the same store as the payee, buying items that are on the payee's wish list at online stores such as Amazon, or the like. FIGS. 7A and 7B show exemplary interfaces relating to redirecting payments.

The disclosed embodiments may perform processes that allow the payment process to be flexible and interactive. In one aspect, interface design engine 210 may be configured to perform one or more messaging functions during one or more of the payment transaction processes disclosed herein. In some embodiments, interface design engine 210 may be configured to generate information that is provided in an interface sent to client 114 that provides the user with one or more channels of communication, such as, for example, text messaging, email mechanisms, social networking sites, or the like. In some embodiments, interface design engine 210 may be configured to interact with messaging engine 221 to determine the most effective or preferred way of communication for a user based on one or more factors including, for example, information relating to email accounts, customer transaction history information (e.g., relating to financial service provider 110), information relating to a cell phone, social networking sites, and the like. For instance, messaging engine 221 may be configured to request, collect, maintain, and/or track information relating to the user's communication capabilities, such as particular social networking sites, email accounts, text messaging accounts, etc. Messaging engine 221 may provide that information to interface design engine 210 to generate information that is provided in an interface sent to client 114 that allows the user to communicate via one or more of the communication channels (e.g., a payer may choose to communicate with a payee during the payment transaction via text messages). Interface design engine 210 may be configured to determine the best-fit communication channels by considering the user's input provided to interface dialog engine 211 for setting up the interface (e.g., user's preference for one or more communication channels), user's contact list stored in client 114 (e.g., a smartphone or a tablet), historical activities, activities shown on social networking sites, etc. Messaging engine 221 may also be configured to provide information relating to the user's preference for communication channels to PPG 102/202. Based on the information, PPG 102/202 may determine the best-fit communication channel (s) to deliver messages to the user (e.g., send the user a reminder to make a payment). Examples of these communication channels may include, for example, SMS, MMS, emails, voice mail serves, social networking sites (e.g., Facebook®, Twitter), and the like.

In other embodiments, interface design engine 210 may also be configured to interact with messaging engine 221 to determine the content of messages displayed to the payer and/or the payee by the interface. Interface design engine 210 may be configured to obtain this determination by interacting with messaging engine 221, and display messages by the interface sent to client 114 accordingly. Messaging engine 221 may be configured to collect, obtain, request, and consider information such as, for example, the type of payment, the occasion of the payment, the payment triggering party, static input (e.g., the user's input provided to interface dialog engine 211 for setting up the interface, pre-filled information provided by PPG 102/202 via interface dialog engine 211 and accepted by the user, or rules and regulations relating to the restrictions for sending commercial messages), behavioral inputs (e.g., historical use or receptiveness to certain messages), and the like.

In some embodiments, interface design engine 210 may be configured to generate information that is provided in an interface sent to client 114 that includes one or more commercial messages (e.g., promotional offers). Messaging engine 221 may also be configured to determine the content of commercial messages to which a payer or a payee will most likely be responsive. FIGS. 6G and 7B show exemplary interfaces including exemplary commercial messages. To ensure the appropriateness of commercial messages, interface design engine 210 may be configured to interact with messaging engine 221 to determine whether certain commercial messages are proper for a particular user or whether the particular user is likely to be responsive to these commercial messages, and display commercial messages via the interface accordingly. Messaging engine 221 may be configured to perform processes for determining targeted commercial messages for particular users based on, for example, user profile information (e.g., demographics, membership, loyalty information, behavioral data, etc.).

Additionally or alternatively, interface design engine 210 may be configured to generate information that is provided in an interface sent to client 114 that allows a user to exchange information via the interface. For example, interface design engine 210 may be configured to generate information that is provided in an interface sent to client 114 that allows the payer to initiate an information exchange and/or a document exchange (e.g., upload a picture, a card, a poem, a letter, a tweet, a link, etc.). In some other embodiments, interface design engine 210 may be configured to generate information that is provided in an interface sent to client 114 that allows the user to communicate using social networking services.

To keep parties associated with the payment transaction updated with respect to the progress of the payment transaction, interface design engine 210 may be configured to generate information that is provided in an interface sent to client 114 that includes the payment progress status. For example, interface design engine 210 may be configured to interact with payment status engine 223 to obtain information reflecting one or more stages of completion of the payment transaction. Interface design engine 210 may be configured to generate information that is provided in an interface sent to client 114 that includes one or more status messages such as, for example, payment initiated, payment in process, notification received by the payee, route selected, payment reserved, payment completed, payment declined, payment ignored, and the like. Interface design engine 210 may be configured to generate information that is provided in an interface sent to client 114 that includes the status in the form of, for example, a progress bar, text, graphics, etc. In some aspects, interface design engine 210 may provide detailed feedback with respect to the status of the payment to the parties via the interface. For example, interface design engine 210 may generate information that is provided in an interface sent to client 114 that includes a confirmation message when the payment is completed.

Figure 3:
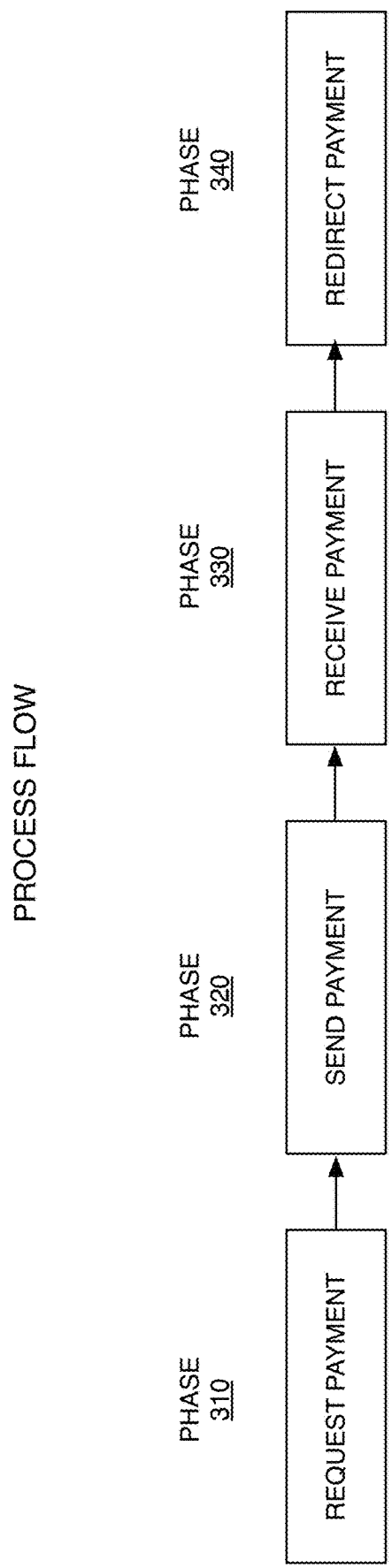
FIG. 3 is an exemplary process flow for effecting payment transactions consistent with the disclosed embodiments.

FIG. 3 illustrates an exemplary process flow for providing payment transactions consistent with the disclosed embodiments. At phase 310, interface design engine 210 may be configured to provide information via an interface that allows a payer, or a payee, or PPG 202 to initiate a payment request (some aspects are discussed in greater detail at FIGS. 4A-4D). At phase 320, interface design engine 210 may be configured to provide information via an interface that allows the payer to send the payment (some aspects are discussed in greater detail at FIGS. 5A-5E). At phase 330, interface design engine 210 may be configured to provide information via an interface that allows the payee to receive the payment (some aspects are discussed in greater detail at FIGS. 6A-6G). At phase 340, interface design engine 210 may be configured to provide information via an interface that facilitates the payee to redirect the received payment (some aspects are discussed in greater detail at FIGS. 7A and 7B).

Figure 4A:
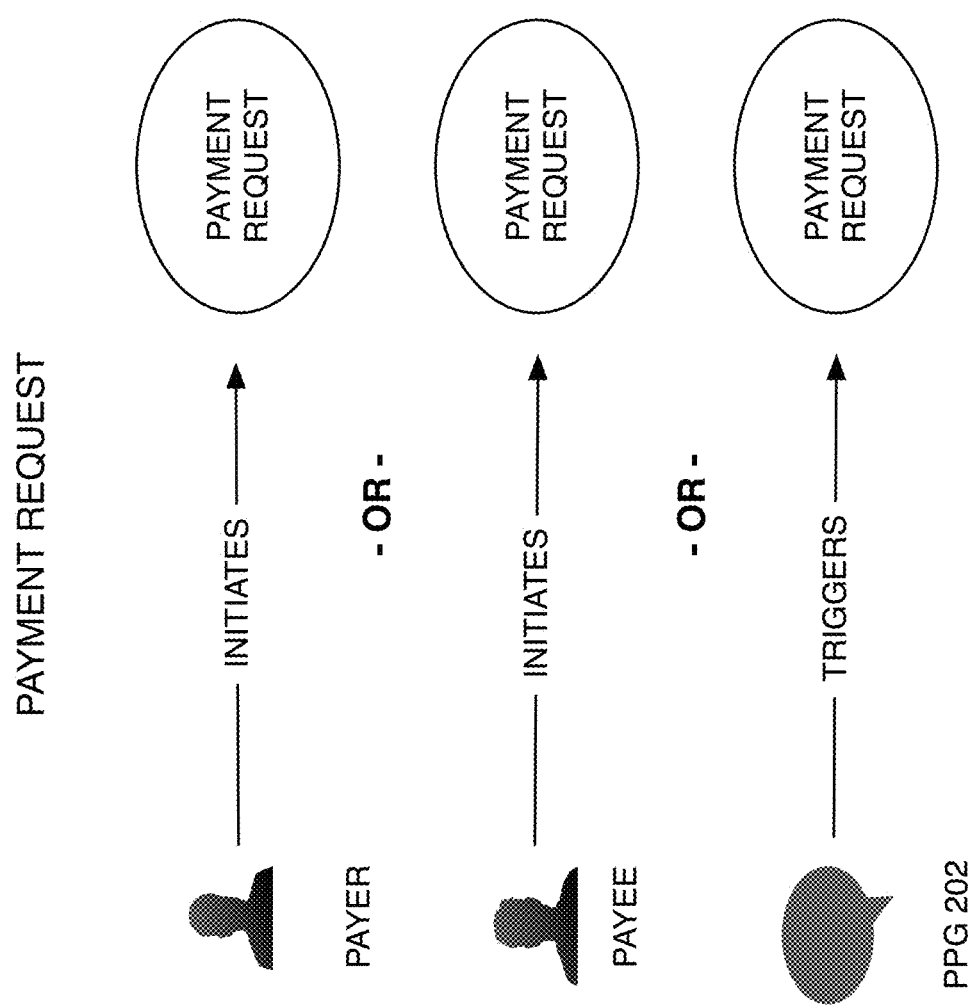
FIG. 4A is an exemplary diagram of payment request processes consistent with the disclosed embodiments.

As illustrated in FIG. 4A according to some embodiments, interface design engine 210 may be configured to provide mechanisms via an interface sent to client 114 that allow various parties to initiate payment requests, such as a payer, payee, or PPG 202.

Figure 4C:
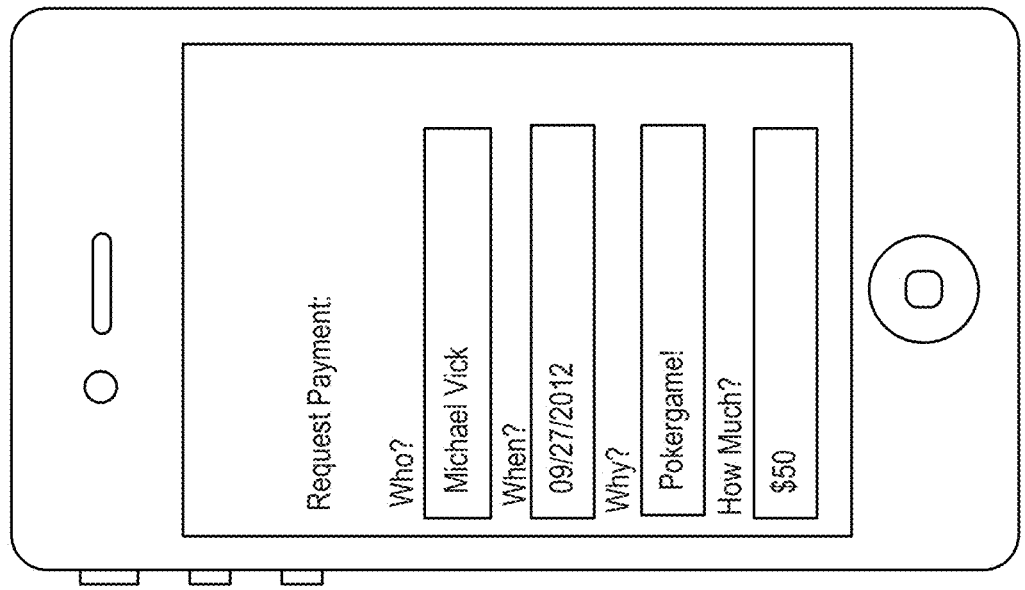
FIG. 4C is a screenshot of an exemplary payee payment request interface consistent with the disclosed embodiments.
Figure 4B:
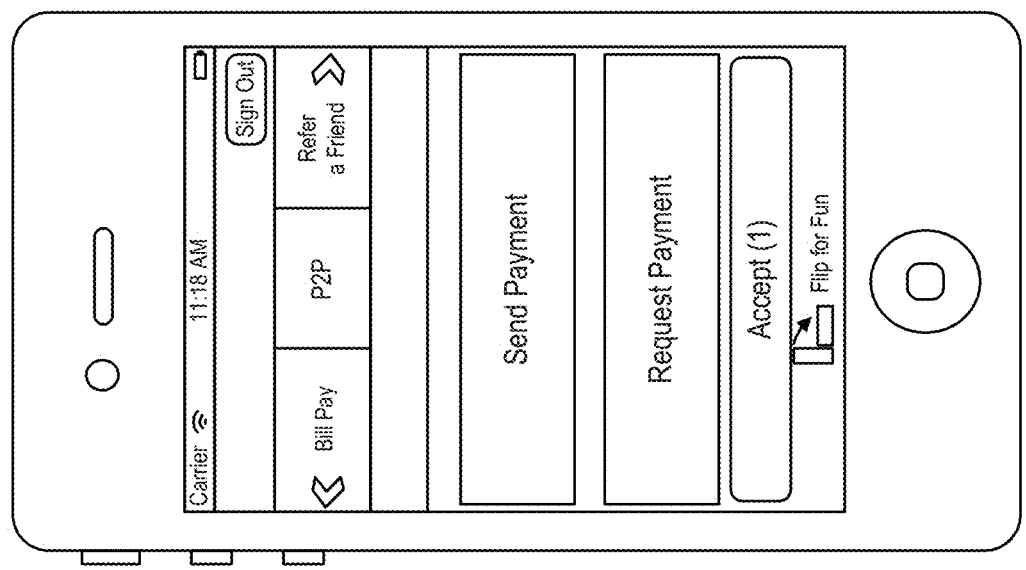
FIG. 4B is a screenshot of exemplary payer payment request interface consistent with the disclosed embodiments.

As shown in FIG. 4B according to some embodiments, interface design engine 210 may be configured to generate information that is provided in an interface sent to client 114 that allows the payer to initiate a payment request by logging in the system of PPG 202 and choosing the option of request payment. In one aspect, the payer may initiate the payment request from a website associated with financial service provider 110. Alternatively, the payer may initiate the payment request through a mobile application provided by or associated with PPG 202 that is downloaded on client 114 (e.g., a smartphone or a tablet).

As shown in FIG. 4C accordingly to some embodiments, interface design engine 210 may be configured to generate information that is provided in an interface sent to client 114 that allows the payee to initiate a payment request. For example, the payee may request the payment by logging into PPG 202 (e.g., via portal, website, or other online or networked system) and provide information such as, for example, the payer's name, date of request, payment amount, and reason for requesting this payment, and the like. In one aspect, the payee may initiate the payment request from the website of financial service provider 110. Alternatively, the payee may initiate the payment request by using a mobile application provided by, or associated with, PPG 202 that may be downloaded on client 114.

Figure 4D:
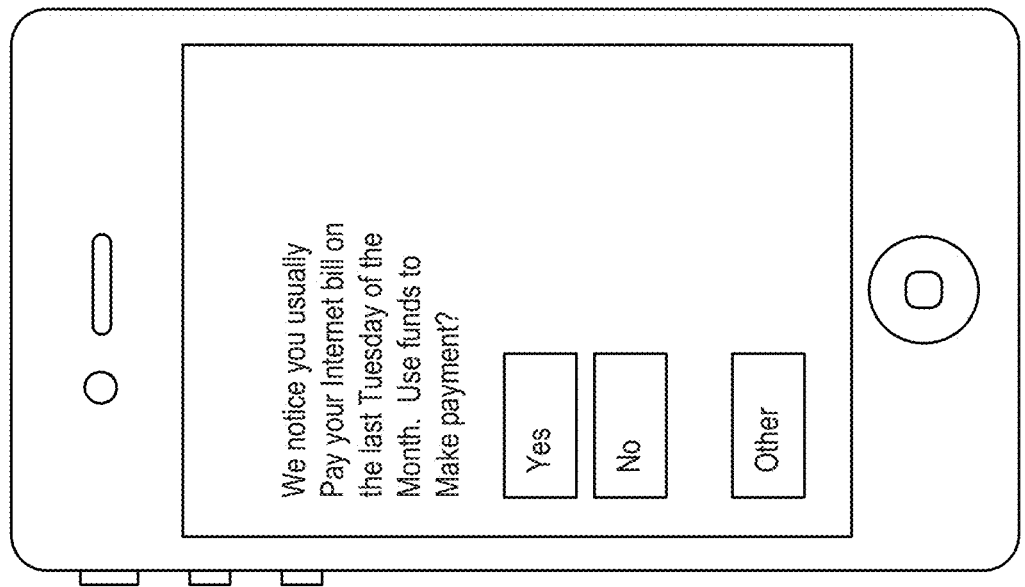
FIG. 4D is a screenshot of an exemplary payment request trigger interface consistent with the disclosed embodiments.

As shown in FIG. 4D according to some embodiments, interface design engine 210 may be configured to display payment reminders or suggestions (e.g., time to pay a bill) via an interface. In some embodiments, interface design engine 210 may be configured to generate information that is provided in an interface sent to client 114 that includes one or more reminders or suggestions generated by PPG 202. PPG 202 may execute instructions to perform functions related to obtaining information from, for example, calendars, payment history, social networking sites, billers, retailers, merchants, utility companies, etc. to identify one or more events that might warrant a payment. Based on this information, PPG 202 may determine whether to execute instructions to trigger interface design engine 210 to generate information that is provided in an interface sent to client 114 that includes such reminders or suggestions. For example, a social networking site (e.g., Facebook®) associated with a user may include information that indicates a relative of the user has an approaching birthday. PPG 202 may be configured to collect this information. Based on that information, interface design engine 210 may generate information that is provided in an interface sent to client 114 that includes a suggestion to the user to send a gift card or other type of payment to the relative as a birthday gift. Other types of suggestions and sources for those suggestions may be implemented consistent with the disclosed embodiments.

Figure 5A:
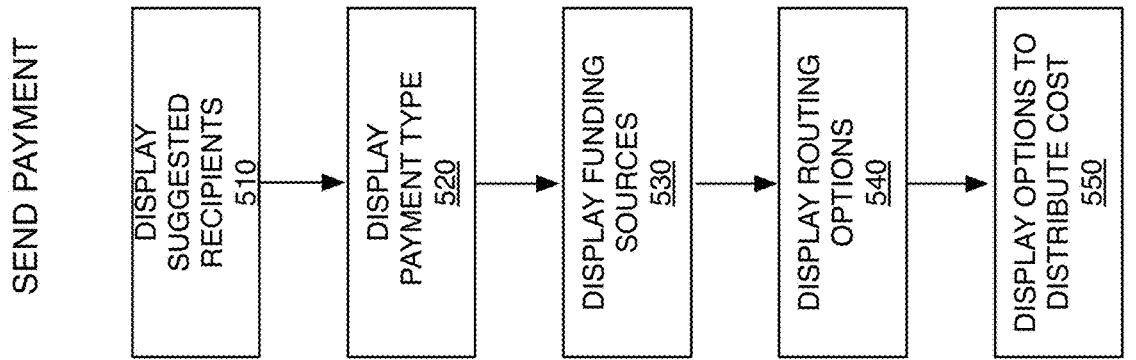
FIG. 5A is an exemplary process flow for sending payment consistent with the disclosed embodiments.
Figure 5B:
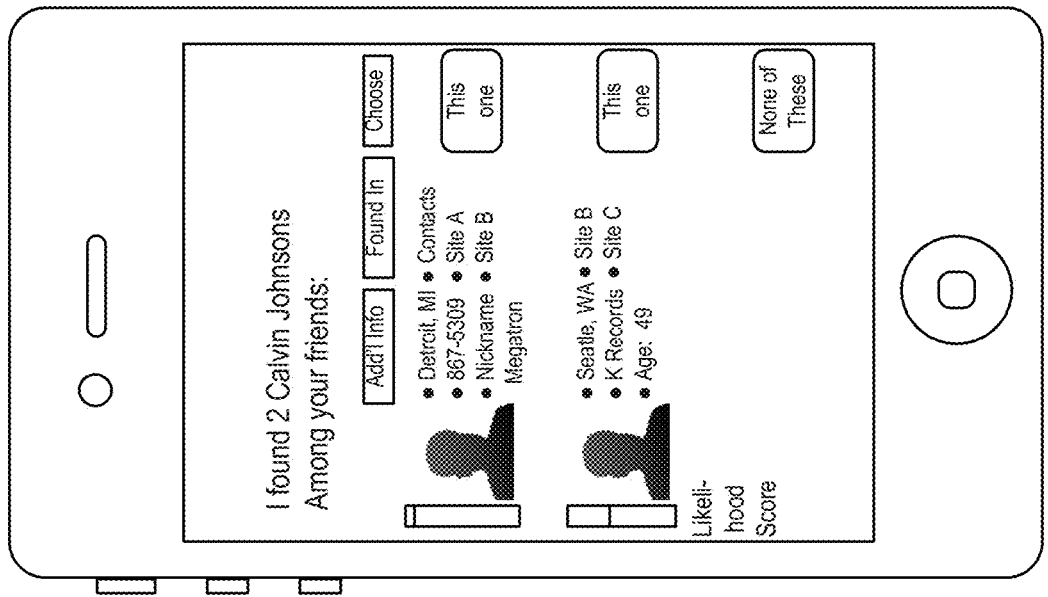
FIG. 5B is a screenshot of an exemplary intended payee identification interface consistent with the disclosed embodiments.
Figure 5B:
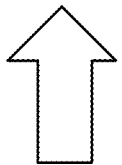
Figure 5B:
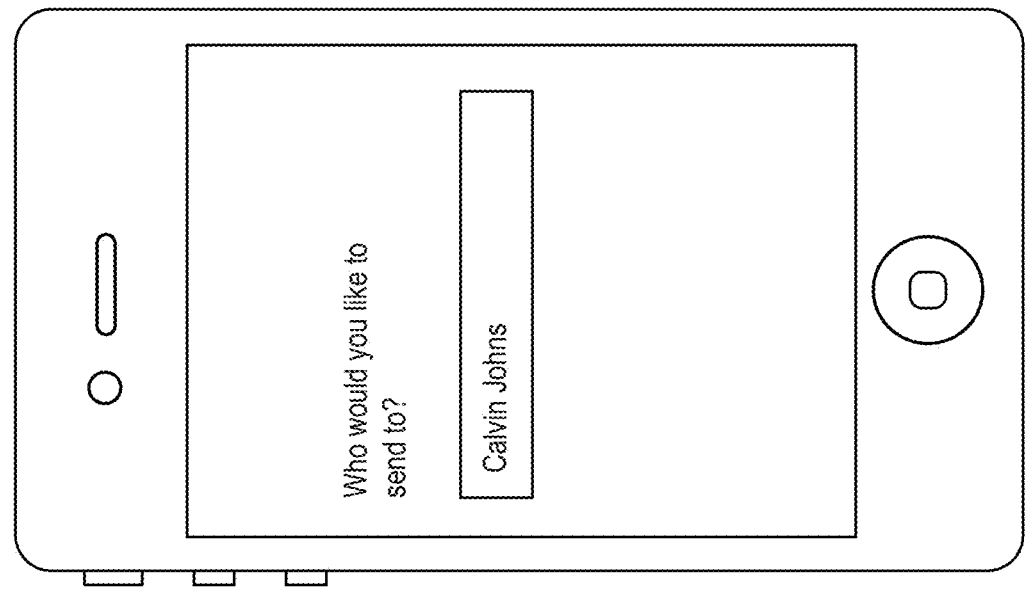

FIG. 5A shows a process flow for sending payment consistent with disclosed embodiments. In one aspect, interface design engine 210 may be configured to generate information that is provided in one or more interfaces sent to client 114 associated with the processes of FIG. 5A. For example, to facilitate the payer to send the payment in a flexible and convenient way, interface design engine 210 may be configured to perform functions including, for example, generating information that is provided in an interface sent to client 114 that includes suggested payees based on input from the payer (step 510). Interface design engine 210 may also generate information that is provided in an interface sent to client 114 that includes a suggested payment type (step 520). Interface design engine 210 may also generate information that is provided in an interface sent to client 114 that includes one or more suggested funding sources to fund the payment (step 530). In another aspect, interface design engine 210 may generate information that is provided in an interface sent to client 114 that includes one or more suggested routing sources to rail the payment (step 540). Interface design engine 210 may also generate information that is provided in an interface sent to client 114 that includes one or more options to distribute cost associated with certain routing options (step 550).

In some embodiments, interface design engine 210 may be configured to provide an interface that requests minimum input from a user for sending the payment from the payer (e.g., step 510). For example, as shown in FIG. 5B according to some embodiments, interface design engine 210 may generate information that is provided in an interface sent to client 114 that allows the payer to provide one or more pieces information related to an intended payee (e.g., only provide the intended payee's name "Calvin Johns"). In some aspects, requested information may include, for example, name, e-mail address, physical address, etc. In other aspects, interface design engine 210 may be configured to generate information that is provided in an interface sent to client 114 that allows the payer to input the information of the payee by ways including, for example, voice input, tying, token, and/or shortlisted entry.

Based on the information provided by the payer, as shown in FIG. 5B according to some embodiments, interface design engine 210 may generate information that is provided in an interface sent to client 114 that includes one or more suggested recipients (e.g., Calvin Johnsons from Detroit and Calvin Johnsons from Seattle) by interacting with payee identity engine 213 (some aspects were discussed in greater detail above). To better assist the payer to select the intended payee, interface design engine 210 may generate information that is provided in an interface sent to client 114 that includes additional identification information of the suggested recipients including, for example, a level of confidence with respect to the likelihood of each of the provided candidate payee(s) being the intended payee (e.g., likelihood score reflected in a color bar), pictures, addresses (e.g., Detroit, Mich. and Seattle, Wash.), phone numbers (e.g., 867-5309), data sources used for identifying the suggested recipients (e.g., Site A (may be Facebook®) and Site B (may be LinkedIn®)), and other confirmatory data (e.g., age and Nickname). Additionally or alternatively, if the intended payee is not included in the suggested recipients, interface design engine 210 may be configured to generate information that is provided in an interface sent to client 114 that allows the payer to provide feedback (e.g., option of "none of these") that is used by PPG 102/202 for providing other options to identify a payee.

Figure 5C:
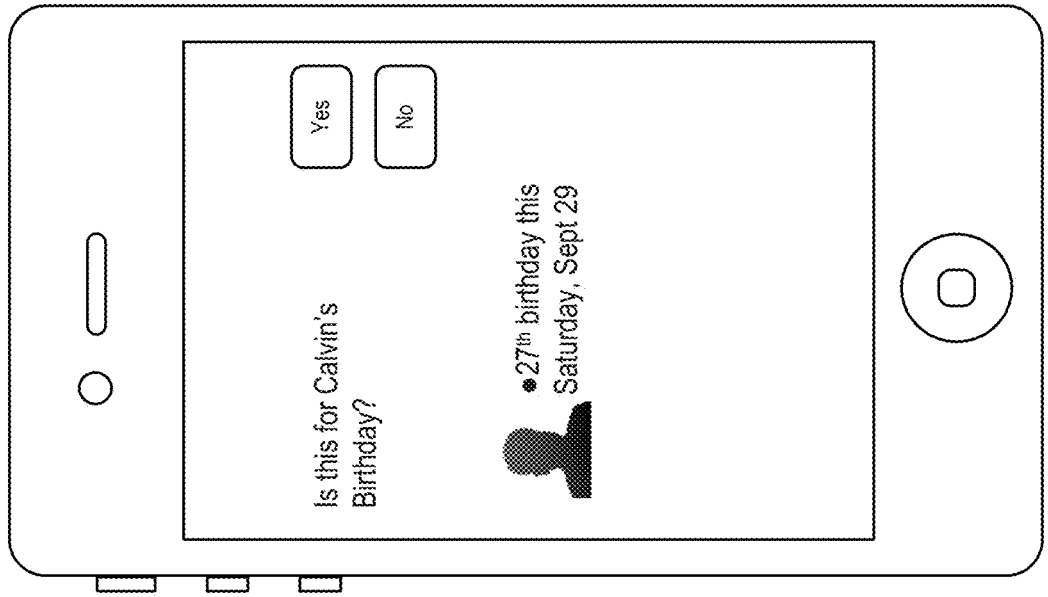
FIG. 5C is a screenshot of an exemplary payment amount and type interface consistent with the disclosed embodiments.
Figure 5C:
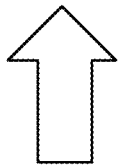
Figure 5C:
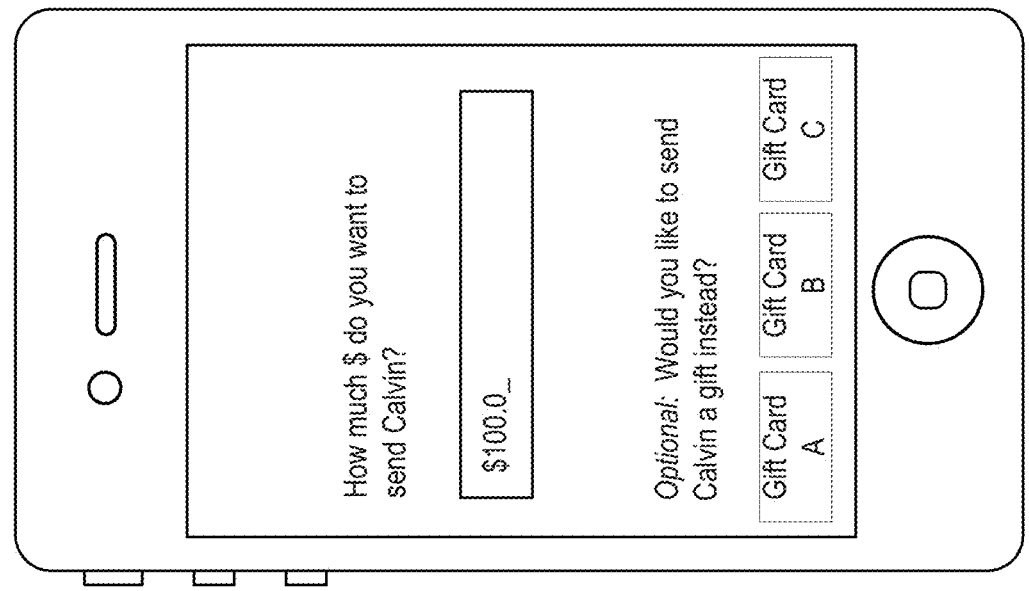

In some embodiments, interface design engine 210 may be configured to generate information that is provided in an interface sent to client 114 that allows the payer to select a payment type (e.g., step 520). For example, as shown in FIG. 5C, according to some embodiments, interface design engine 210 may generate an interface that provides alternative payment types if it determines that the payer initially chose to send the payment by cash and enters into the amount of money he/she wanted to transfer (e.g., $100) (e.g., "Optional: Would you like to send Calvin a gift instead?"). As shown in FIG. 5C according to some embodiments, based on the information about the intended payee and the payment type (e.g., Calvin and gift card), PPG 102/202 may execute instructions to determine whether the payment is for a particular purpose, such as, the intended payee's birthday, and may cause interface design engine 210 to display this particular purpose (e.g., "Is this for Calvin's birthday?") for the payer to confirm. If the particular purpose is confirmed, interface design engine 210 may be configured to perform other functions via the interface consistent with the disclosed embodiments, such as, for example, allow the payer to send a birthday card or upload a picture or a video together with the payment.

In some embodiments, interface design engine 210 may be configured to generate information that is provided in an interface sent to client 114 that allows the payer to choose a funding source to fund his/her payment (e.g., step 530). For example, the payer may choose to fund the payment from the user's saving account, checking account, credit card, or the like. In some embodiments, the suggested funding source displayed via the interface may be the payer's preferred funding source, as determined by funding source engine 215 (some aspects were discussed in greater detail above).

Figure 5D:
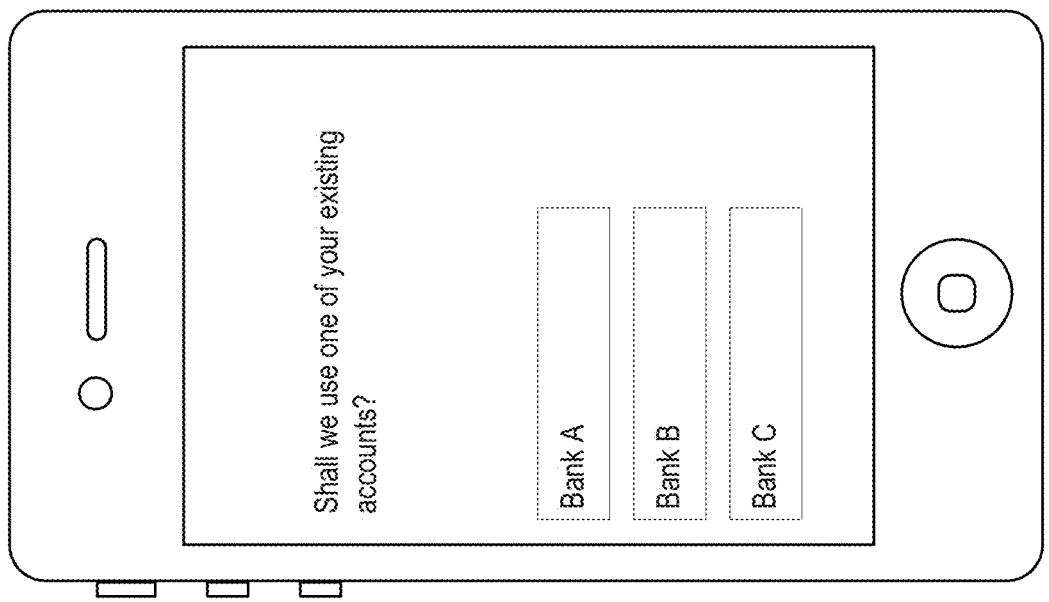
FIG. 5D is a screenshot of an exemplary payment routing option interface consistent with the disclosed embodiments.

In some embodiments, interface design engine 210 may be configured to generate information that is provided in an interface sent to client 114 that includes one or more routing options for the payer to choose (e.g., step 540). For example, as shown in FIG. 5D according to some embodiments, interface design engine 210 may generate information that is provided in an interface sent to client 114 that includes a routing option to rail the payer's payment via the interface (e.g., Bank A (may be clover) or Bank B (may be PayPal™) or Bank C (may be venmo)). In some aspects, the routing options shown via the interface may be ones preferred by the payer, as determined by routing option engine 217, as described above. In some aspects, interface design engine 210 may be configured to generate information that is provided in an interface sent to client 114 that allows the payer to limit, expand, or recommend certain routing options to be displayed to the payee. In other aspects, interface design engine 210 may be configured to generate information that is provided in an interface sent to client 114 that includes one or more routing options that the payee is currently signed up for or aligned with.

Figure 5E:
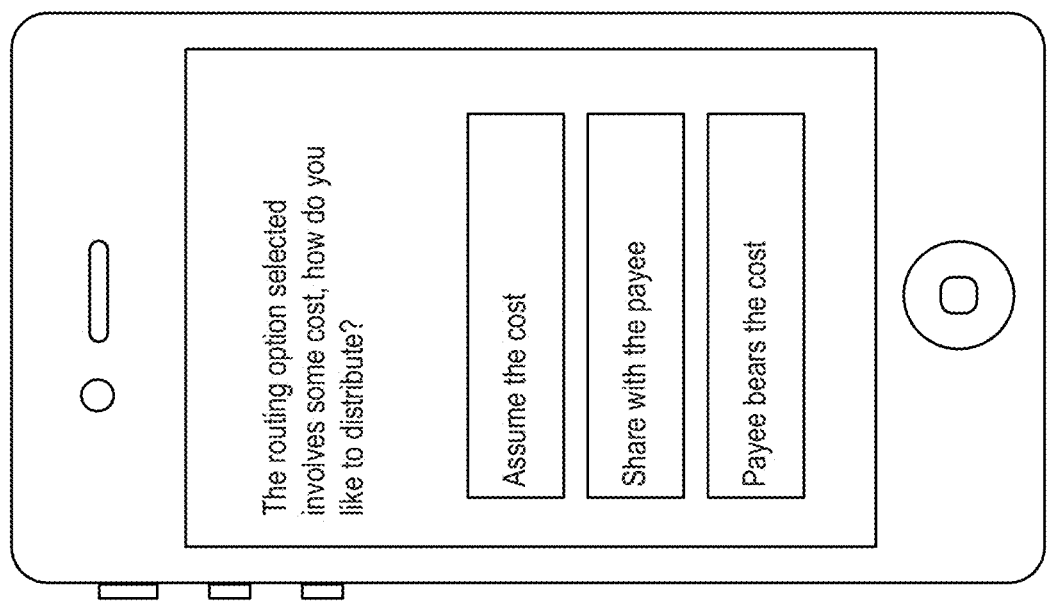
FIG. 5E is a screenshot of an exemplary distributing cost interface associated with a selected routing option consistent with the disclosed embodiments.

In some embodiments, certain routing options may involve some cost. Interface design engine 210 may be configured to generate information that is provided in an interface sent to client 114 that includes option(s) for the payer to distribute the cost associated with the selected routing option (e.g., step 550). For example, as shown in FIG. 5E according to some embodiments, interface design engine 210 may generate information that is provided in an interface sent to client 114 that allows the payer may choose, via the interface, to bear the cost on his/her own, share the cost with the payee, or choose to have the payee to bear the cost.

FIG. 6A shows a process flow for receiving payment consistent with disclosed embodiments. As illustrated in FIG. 6A according to some embodiments, interface design engine 210 may be configured to generate information that is provided in an interface sent to client 114 that provides guidance to the payee for receiving the payment. To assist the payee in receiving the payment in a flexible and timely manner, interface design engine 210 may be configured to perform functions including, for example, generating information that is provided in an interface sent to client 114 that shows a notice of incoming payment to the payee via the interface (e.g., step 610). Interface design engine 210 may also generate information that is provided in an interface sent to client 114 that provides the payee with an option to reject or accept the payment (e.g., step 620). Interface design engine 210 may also generate information that is provided in an interface sent to client 114 that includes one or more routing options to receive the payment (e.g., step 630). Interface design engine 210 may also generate information that is provided in an interface sent to client 114 that includes an option for receiving the payment immediately (e.g., step 640).

Figure 6B:
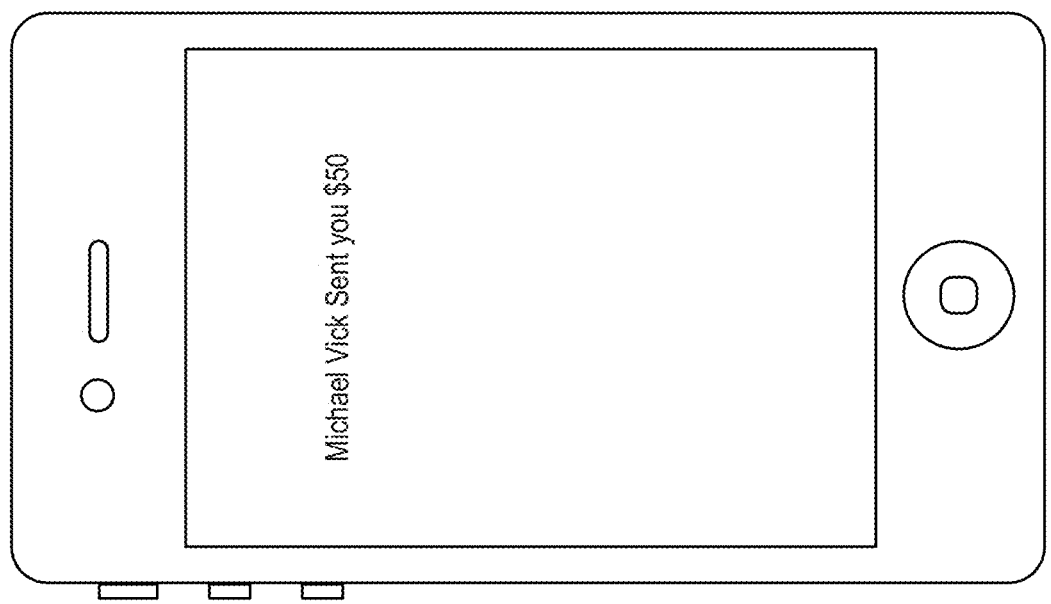
FIG. 6B is a screenshot of an exemplary interface providing a notice informing a payee of an incoming payment consistent with the disclosed embodiments.

As shown in FIG. 6B according to some embodiments, interface design engine 210 may be configured to generate information that is provided in an interface sent to client 114 that provides a notice to the payee informing the payee of the incoming payment via the interface (e.g., "Michael Vick Sent you $50") (e.g., step 610). The notice may contain information including, for example, the payer, the amount of payment, the reason of the payment, and other information relating to the payment.

Figure 6C:
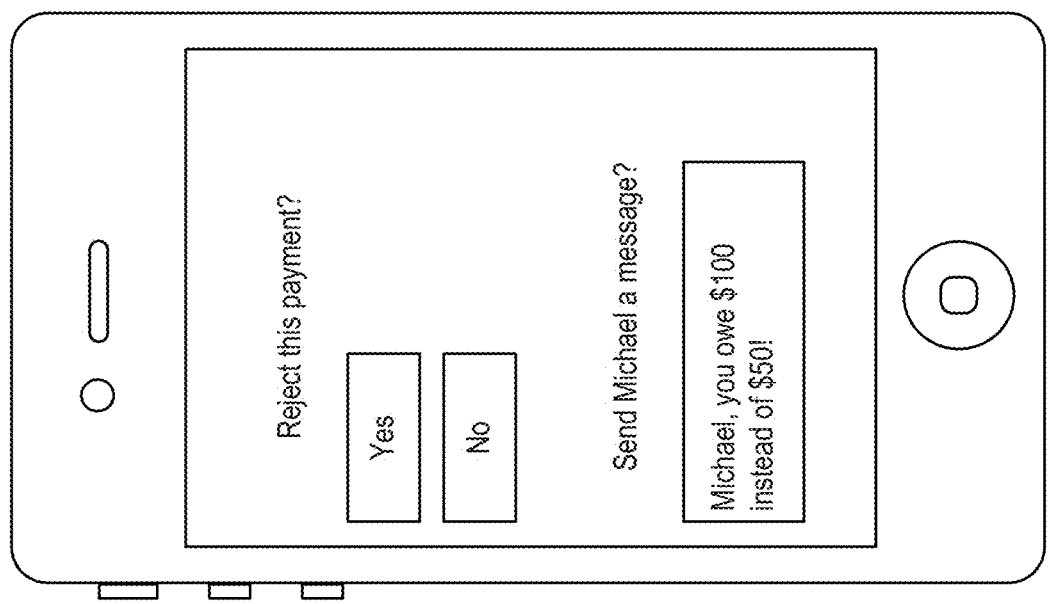
FIG. 6C is a screenshot of an exemplary interface providing a payee with an option to reject or accept an incoming payment consistent with the disclosed embodiments.

As shown in FIG. 6C according to some embodiments, interface design engine 210 may be configured to generate information that is provided in an interface sent to client 114 that provides the payee with an option of either accepting or rejecting the incoming payment (e.g., step 620). In some aspects, as shown in FIG. 6C, interface design engine 210 may be configured to generate information that is provided in an interface sent to client 114 that allows the payee to provide reasons for rejecting the incoming payment, which may include, for example, the payment amount is incorrect, the payee is not the intended payee, or the like. Additionally or alternatively, interface design engine 210 may be configured to generate information that is provided in an interface sent to client 114 that allows the payee to amend the payment by requesting the payer to pay for costs associated with the payment transaction (e.g., paying for paper check costs).

Figure 6D:
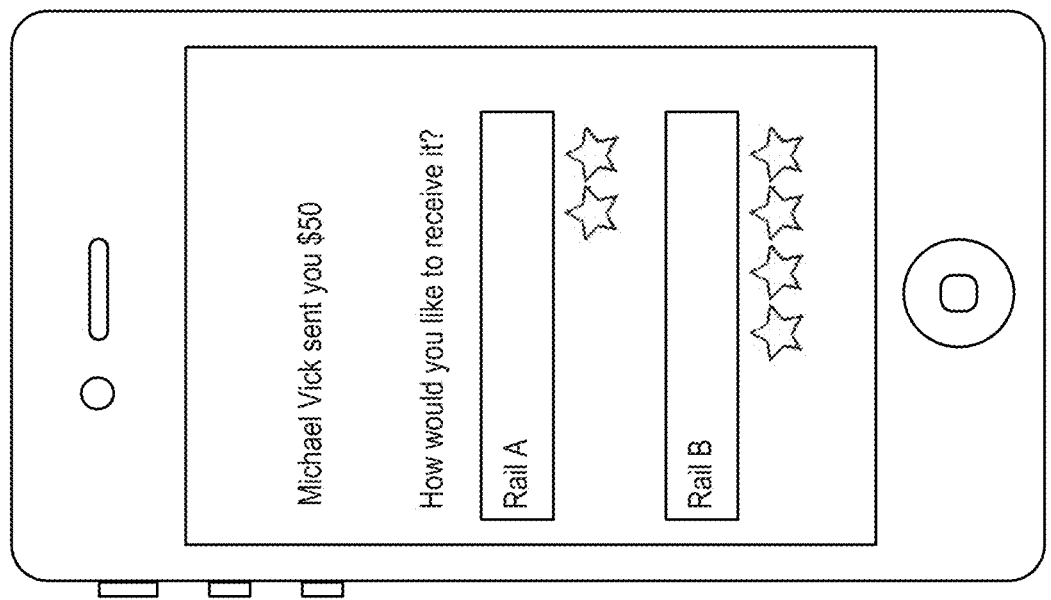
FIG. 6D is a screenshot of an exemplary interface suggesting routing options of receiving a payment consistent with the disclosed embodiments.
Figure 6E:
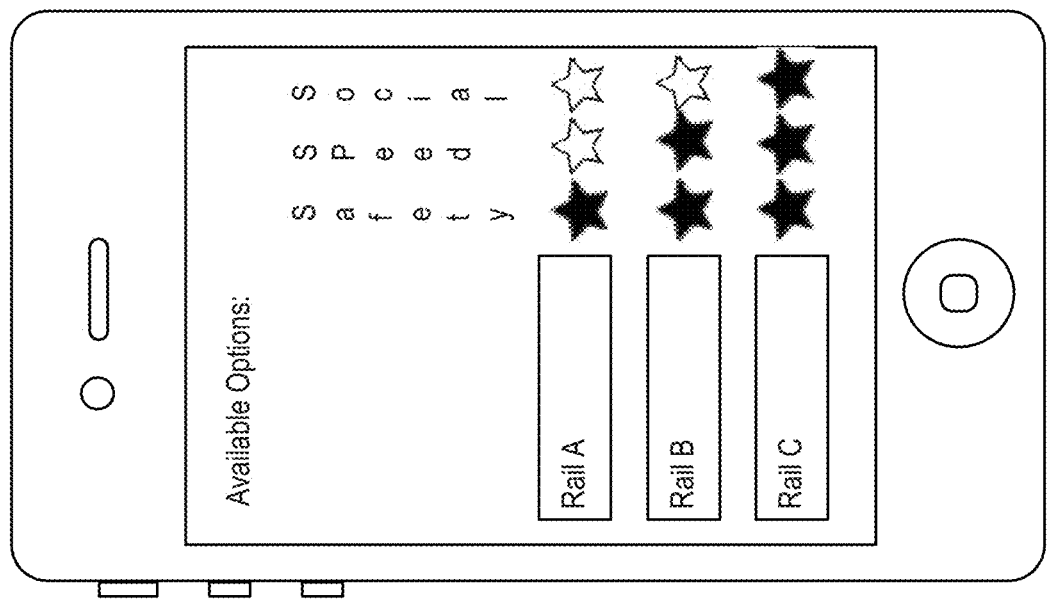
FIG. 6E is a screenshot of an exemplary interface for suggesting routing options with associated rankings consistent with the disclosed embodiments.

Once the payee accepts the payment, interface design engine 210 may be configured to generate information that is provided in an interface sent to client 114 that includes one or more routing options for the payee to receive the payment (e.g., step 630). In some embodiments, interface design engine 210 may be configured to obtain suggested routing options and their rankings by interacting with routing option engine 217 of PPG 102/202 (some aspects were discussed in greater detail above). As shown in FIG. 6D according to some embodiments, interface design engine 210 may be configured to generate information that is provided in an interface sent to client 114 that includes one or more suggested routing options (e.g., Rail A (may be PayPal™) and Rail B (may be Electric Orange)) and their associated rankings (e.g., as reflected by a number of stars). Other types of graphics or content may be used to reflect associated rankings (e.g., bars, numbers, text, etc.). As shown in FIG. 6E according to some embodiments, interface design engine 210 may be configured to generate information that is provided in an interface sent to client 114 that includes one or more parameters for each of the rankings (e.g. safety, speed, social). The parameters displayed via the interface may include, for example, safety, speed, cost, stability, customer experience, crowed sourced rankings, etc.

Figure 6F:
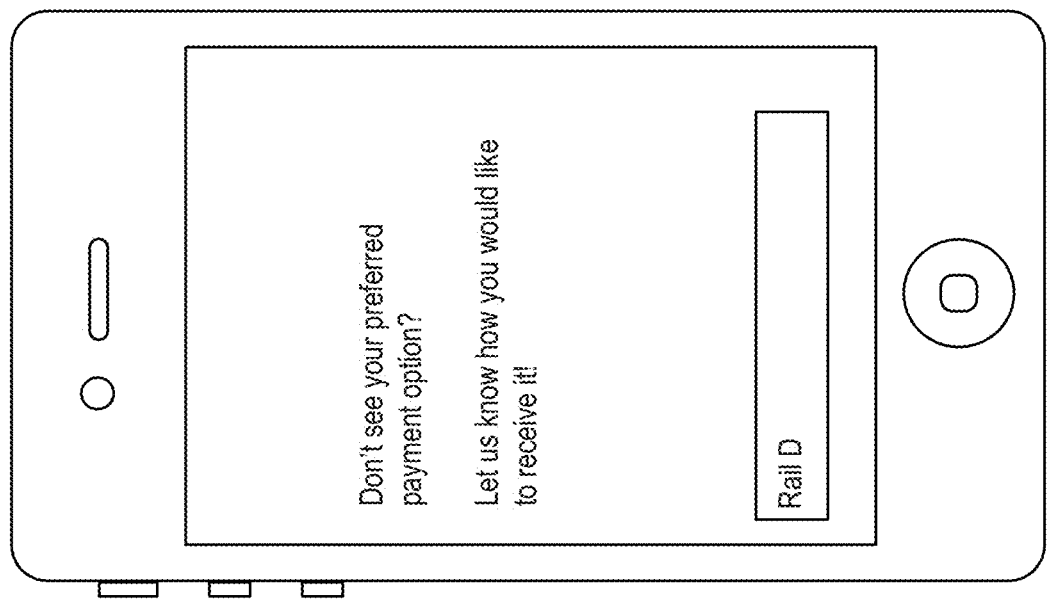
FIG. 6F is a screenshot of an exemplary interface for a payee to input a routing option consistent with the disclosed embodiments.
Figure 6G:
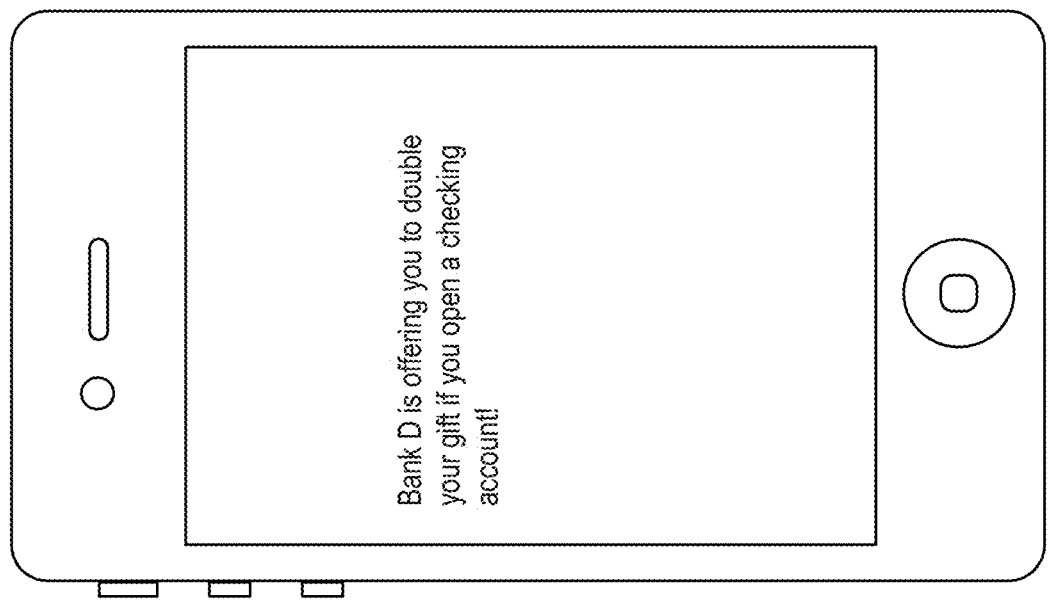
FIG. 6G is a screenshot of an exemplary interface providing a commercial message consistent with the disclosed embodiments.

Additionally or alternatively, as shown in FIG. 6F according to some embodiments, if the payee's preferred routing option is not listed in the suggested routing options, interface design engine 210 may be configured to generate information that is provided in an interface sent to client 114 that allows the payee to enter the payee's preferred routing option (e.g., Rail D (may be Greendot®)).

Additionally or alternatively, to better assist the payee to select a routing option, interface design engine 210 may be configured to generate information that is provided in an interface sent to client 114 that includes one or more alternative options and display incentives associated with choosing a suggested alternative option. As shown in FIG. 6G according to some embodiments, interface design engine 210 may be configured to generate information that is provided in an interface sent to client 114 that includes one or more commercial messages to the payee associated with selecting routing options (e.g., "open a checking account"). Moreover, interface design engine 210 may also generate information that is provided in an interface sent to client 114 that includes one or more incentives for the user upon choosing a suggested routing option (e.g., "Bank D is offering you to double your gift if you open a checking account").

Depending on the selected routing option, the payee may not immediately receive the funds associated with a payment. For example, if the payer deposits some money directly into the payee's bank account, the payee may not withdraw or use the payment immediately. In some embodiments, interface design engine 210 may be configured to generate information that is provided in an interface sent to client 114 that allows the payee to apply for credit advance (e.g., step 640 shown in FIG. 6A).

As shown in FIG. 7A according to some embodiments, interface design engine 210 may be configured to generate information that is provided in an interface sent to client 114 that includes one or more allocation options for the payee to redirect his/her received payment. In these examples, the payee may act as the payer. Examples of the allocation options to redirect the payment may include, for example, putting a received payment towards bills of the payee, purchasing groceries at a store, buying a pastry or a candy bar at a store close to the payee for himself/herself or for other parties, or purchasing items at online retailers that the payee has selected on the retailer's website or that the payee previously placed on a "wish list." Additionally or alternatively, as shown in FIG. 7B according to some embodiments, interface design engine 210 may be configured to generate information that is provided in an interface sent to client 114 that includes one or more promotional offers that incentivize the payee to allocate his/her received payment in a certain way (e.g. promotional offers from Retailer A and Retailer B).

Interface design engine 210 may be configured to perform other functions consistent with the disclosed embodiments. For example, to assist the user in making an informed decision associated with payment transaction (e.g., selecting payment rails, communication channels, or allocation options), interface design engine 210 may be configured to generate information that is provided in an interface sent to client 114 that includes a simulation environment to the user without actually requiring them to engage in a real transaction. The simulation environment may provide most of the described functions consistent with the disclosed embodiments. For example, at each step associated with the payment transaction, interface design engine 210 may be configured to provide information via an interface sent to client 114 that includes an assessment of the effort required for completing that step, and/or the degree of complexity involved. In the simulation environment, the user may familiarize himself/herself with the processes performed by PPG 102/202 without actually effecting the payment transaction.

Figure 8:
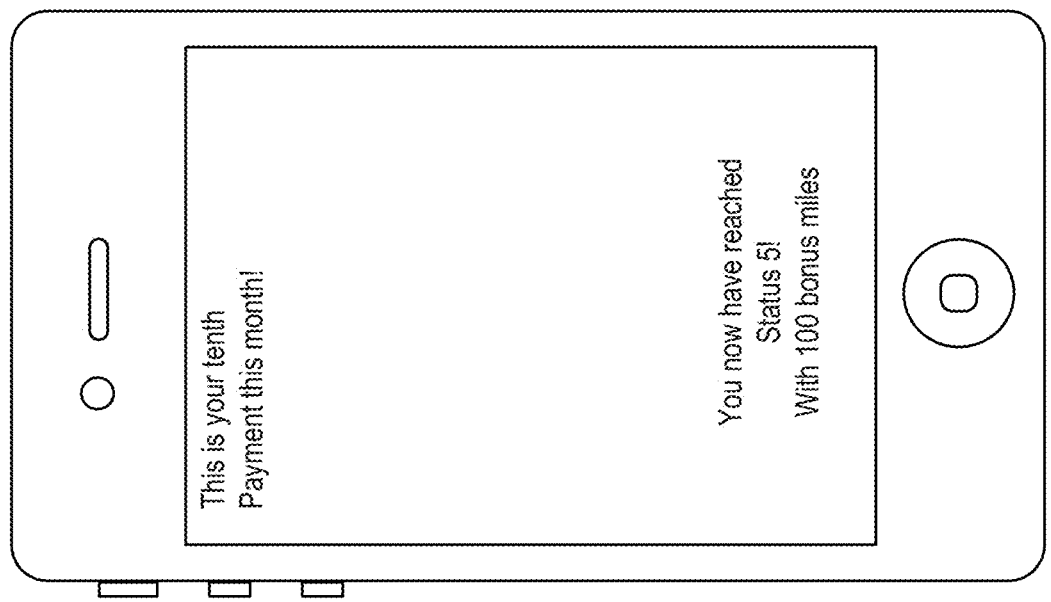
FIG. 8 is a screenshot of an exemplary interface providing user incentives consistent with the disclosed embodiments.

As another example, as shown in FIG. 8, interface design engine 210 may be configured to generate information that is provided in an interface sent to client 114 that includes one or more incentives (both virtual and/or real) for rewarding the user for performing certain personal payment related activities, such as, for example, making certain times of payment using PPG 102/202, opening a new account with financial service provider 110, and the like. The incentives displayed via the interface may include earning status such as, for example, a gold/silver/bronze or superstar/starlet/standing rating associated with an account.

Figure 9A:
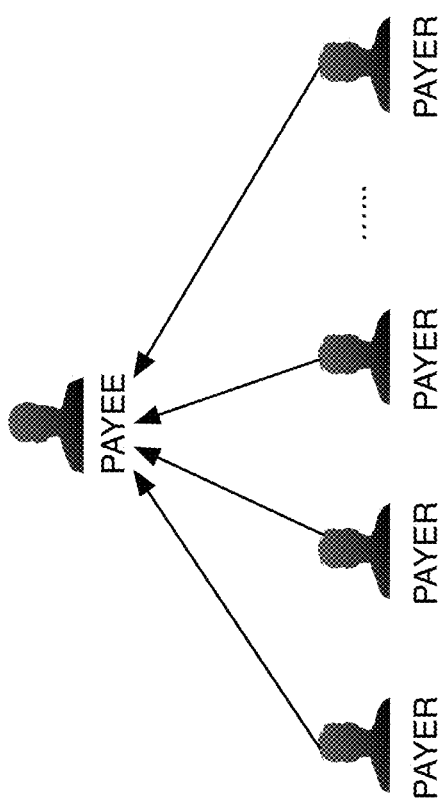
FIG. 9A is an exemplary group payment scenario consistent with the disclosed embodiments.
Figure 9B:
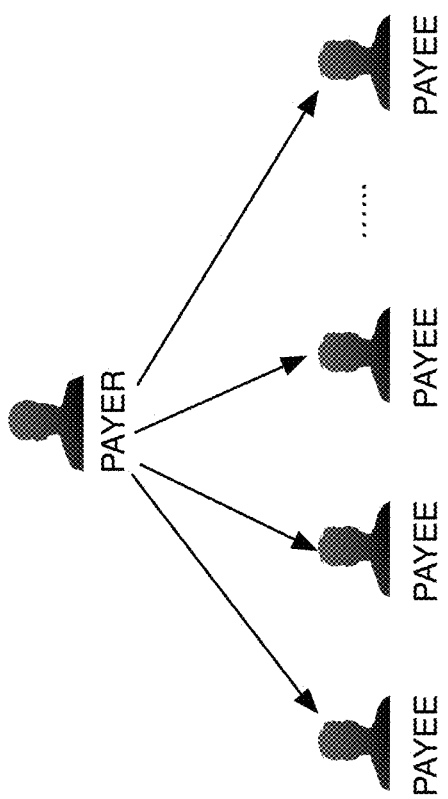
FIG. 9B is an exemplary group payment scenario consistent with the disclosed embodiments.
Figure 9C:
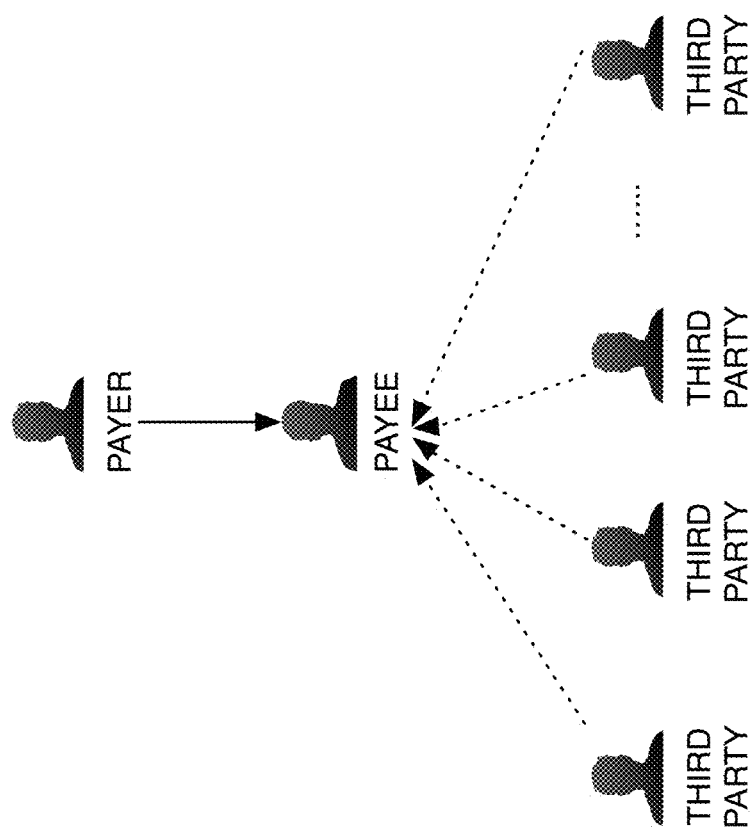
FIG. 9C is an exemplary group payment scenario consistent with the disclosed embodiments.
Figure 9D:
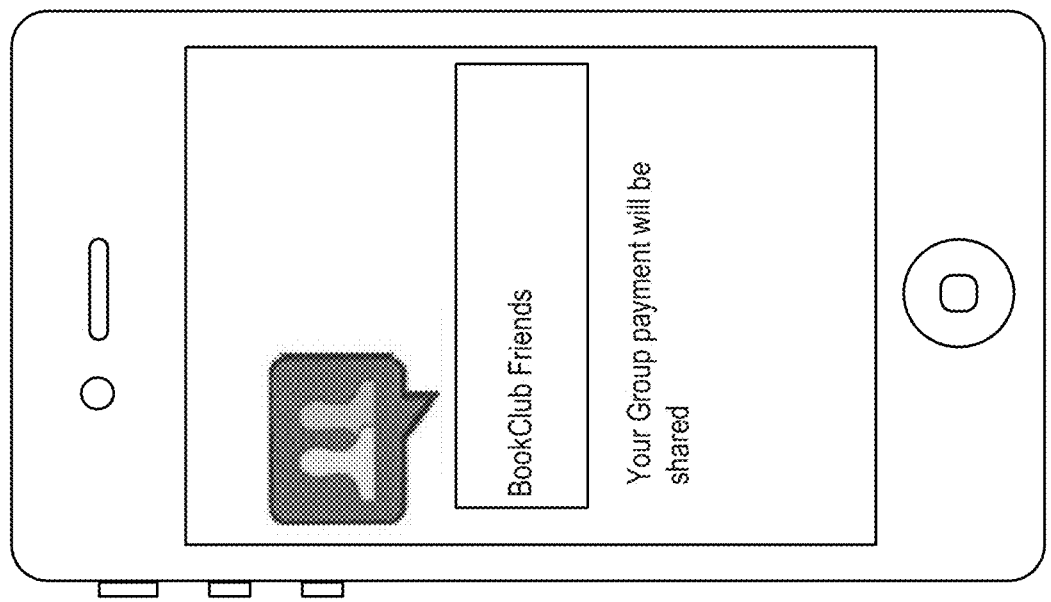
FIG. 9D is a screenshot of an exemplary interface for sharing group payment information consistent with the disclosed embodiments.

In one embodiment, interface design engine 210 may be configured to generate information that is provided in an interface sent to client 114 that allows users to make multiple-party payment transactions. FIG. 9A shows an exemplary scenario involving multiple payers providing payment to a single payee, consistent with some embodiments. Additionally or alternatively, FIG. 9B shows an exemplary scenario involving a payer making payments to multiple payees, consistent with some embodiments. Additionally or alternatively, FIG. 9C shows an exemplary scenario involving a payer making a payment to a single payee on behalf of multiple third parties, consistent with some embodiments. In other aspects, as shown in FIG. 9D, disclosed embodiments may allow a payer to provide payments to multiple payees.

In other aspects, the user may share his/her payment request with a group of users. Interface design engine 210 may generate information that is provided in an interface sent to client 114 that includes information relating to such a group payment, as shown for example in FIG. 9D. In other aspects, interface design engine 210 may be configured to generate information that is provided in an interface sent to client 114 that allows a user to collect money from one or more parties. For example, the user may raise funds for a charity, or the user may run an office pool to raise funds for various purposes. In these situations, interface design engine 210 may be configured to generate information that is provided in an interface sent to client 114 that includes videos, pictures, logos, website link, group discussions, and/or other information relating to the purposes of raising funds.

Figure 10:
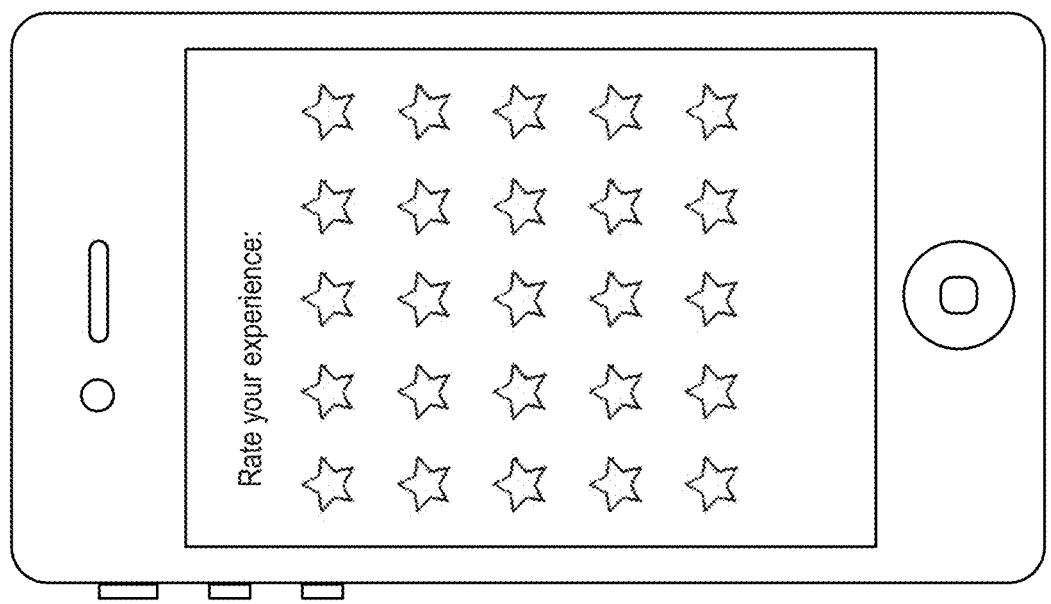
FIG. 10 is a screenshot of an exemplary interface for rating a user's experience consistent with the disclosed embodiments.

As another example, as shown in FIG. 10, interface design engine 210 may be configured to generate information that is provided in an interface sent to client 114 that allows the user to rate his/her experience relating to making personal payment using one or more processes consistent with the disclosed embodiments. In some embodiments, interface design engine 210 may be configured to generate information that is provided in an interface sent to client 114 that allows the user to share his/her experiences via the interface using social networking sites or other broadcast media.

Interface design engine 210 may also be configured to generate information that is provided in an interface sent to client 114 that allows the user to set one or more constraints relating to a payment transaction. For example, interface design engine 210 may generate information that is provided in an interface sent to client 114 that allows the user to set a maximum number of individual transfer amounts, preferred pre-fill of fields, maximum time period amounts, restricted recipients, restricted routing options, locale and time of the payment, and/or the like.

The disclosed embodiments may be associated to different types of financial service accounts. Any financial institution that provides financial service accounts to customers may employ systems, methods, and articles of manufacture consistent with certain principles related to the disclosed embodiments. In addition, other types of entities, such as a merchant, retailer, or other type corporate entity that may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

In certain embodiments, the processes performed by any of the components of PPG 102/202 are not limited to those components. For example, the processes described herein that may be performed by interface design engine 210 may be performed by software instructions not necessarily limited to an interface design engine. For instance, PPG 202 may be configured with software program or programs that perform the processes described above associated with one or more of the engines shown in and described in connection with FIG. 2.

What is claimed is:

1. A system for providing personal payment transactions comprising:
    a processor; and
    a storage device storing instructions that, when executed by the processor, cause the system to perform operations comprising:
        determining a technology skill level for the payer according to one or more of age of a payer, commercial activities associated with the payer, input regarding the payer provided during a set up procedure associated with the system, information gathered from social networking sites associated with the payer, or prior usage of an application by the payer;
        generating a first interface for the payer to effect a personal payment transaction using a payer client device;
        sending the first interface to the payer client device via a network;
        receiving, from the payer via the first interface, identification of at least one payee;
        generating a second interface including one or more options to fund the payment from the payer to the identified at least one payee;
        sending the second interface to the payer client device via the network;
        receiving, from the payer via the second interface, identification of a funding source;
        generating a third interface including one or more payment routing options for the payer to route the payment;
        sending the third interface to the payer client device via the network;
        receiving, from the payer via the third interface, identification of a route;
        generating a fourth interface including a notice of the personal payment transaction, the notice including at least one of the identified at least one payee, the identified funding source, and the identified route; and
        sending the fourth interface to a client device associated with the at least one identified payee,
    wherein at least one of the first, second, and third interfaces is generated as either a voice input interface or a manual input interface based on the technology skill level of the payer.

2. The system of claim 1, wherein the fourth interface includes an option to either accept or reject the personal payment transaction.

3. The system of claim 2, wherein the fourth interface includes an option to provide one or more reasons for rejecting the personal payment transaction.

4. The system of claim 2, wherein the fourth interface is generated as either a voice input interface or a manual input interface based on a technology skill level of the payee.

5. The system of claim 4, wherein the operations further comprise:
    determining the technology skill level for the payee according to one or more of age of the payee, commercial activities associated with the payee, input regarding the payee provided during a set up procedure associated with the system, information gathered from social networking sites associated with the payee, and prior usage of an application by the payee.

6. The system of claim 1, wherein the payee comprises a plurality of payees.

7. The system of claim 6, wherein sending the fourth interface further comprises sending the fourth interface to a plurality of client devices, each client device being associated with a different payee in the plurality of payees.

8. A system for providing personal payment transactions comprising:
    a processor; and
    a storage device storing instructions that, when executed by the processor, cause the system to perform operations comprising:
        generating a first interface for a payer to effect a personal payment transaction using a payer client device;
        sending the first interface to the payer client device via a network;
        receiving, from the payer via the first interface, identifying information about at least one payee;
        generating one or more suggested recipients by consulting at least one electronic source, the at least one electronic source being selected from the payer client device, an electronic database, a social networking site, and electronic account profile information;
        estimating confidence levels corresponding to the one or more suggested recipients based on the identifying information and a payment history associated with the payer, a confidence level indicating a likelihood each suggested recipient is an intended payee;
        generating a second interface including identifications of the one or more suggested recipients and a respective confidence level corresponding to each of the suggested recipients;
        sending the second interface to the payer client device via a network;
        sending the second interface to the payer client device via a network;
        receiving, from the payer via the second interface, a selection of at least one payee from the one or more suggested recipients;

generating a third interface including one or more options to fund the payment from the payer to the selected at least one payee;

sending the third interface to the payer client device via the network;

receiving, from the payer via the third interface, identification of a funding source;

generating a fourth interface including one or more payment routing options for the payer to route the payment;

sending the fourth interface to the payer client device via the network;

receiving, from the payer via the fourth interface, identification of a route;

wherein at least one of the first, second, third, and fourth interfaces is generated as either a voice input interface or a manual input interface based on a technology skill level of the payer.

9. The system of claim 8, wherein the identifying information comprises at least one of a name, an email address, and a physical address.

10. The system of claim 8, wherein the identifications comprise at least one of names, pictures, physical addresses, and phone numbers.

11. The system of claim 8, wherein the confidence levels are further based on a location of the payer and a location of at least one of the one or more suggested recipients.

12. The system of claim 8, wherein the second interface includes the estimated confidence levels.

13. The system of claim 8, wherein the operations further comprise:

generating one or more suggested funding sources based on at least one of an account transaction history associated with the payer, times associated with funding sources, and costs associated with funding sources.

14. The system of claim 13, wherein the one or more options of the third interface comprise the one or more suggested funding sources.

15. The system of claim 8, wherein the operations further comprise:

generating one or more suggested routing options based on at least one of the identified funding source, a location of the payer, a payment history associated with the payer, speeds associated with routing options, and costs associated with routing options.

16. The system of claim 15, wherein one or more payment routing options of the fourth interface comprise the one or more suggested routing options.

17. The system of claim 8, wherein the operations further comprise:

generating a fifth interface including a notice of the personal payment transaction, the notice including at least one of the selected at least one payee, the identified funding source, and the identified route; and sending the fifth interface to a client device associated with the at least one selected payee.

18. A system for providing personal payment transactions comprising:

a processor; and a storage device storing instructions that, when executed by the processor, cause the system to perform operations comprising:

determining a technology skill level for a payee according to one or more of age of a payee, commercial activities associated with the payee, input regarding the payee provided during a set up procedure associated with the system, information gathered from social networking sites associated with the payee, or prior usage of an application by the payee;

generating a first interface for the payee to request a personal payment transaction using a payer client device;

sending the first interface to the payee client device via a network;

receiving, from the payee via the first interface, identifying information about at least one payer;

generating one or more suggested senders by consulting at least one electronic source, the at least one electronic source being selected from the payee client device, an electronic database, a social networking site, and electronic account profile information;

generating a second interface including identifications of the one or more suggested senders;

sending the second interface to the payee client device via a network;

receiving, from the payee via the second interface, a selection of at least one payer from the one or more suggested senders;

generating a third interface including a notice of the request; and sending the third interface to a client device associated with the at least one identified payer, wherein at least one of the first and second interfaces is generated as either a voice input interface or a manual input interface based on a technology skill level of the payee.

19. The system of claim 18, wherein the identifying information comprise at least one of names, pictures, physical addresses, and phone numbers.

20. The system of claim 18, wherein the payer comprises a plurality of payers.

* * * * *